US012136023B2

(12) United States Patent
Fukushima et al.

(10) Patent No.: US 12,136,023 B2
(45) Date of Patent: Nov. 5, 2024

(54) INFORMATION PROCESSING APPARATUS, INFORMATION PROCESSING METHOD, AND COMPUTER PROGRAM

(71) Applicant: KABUSHIKI KAISHA TOSHIBA, Tokyo (JP)

(72) Inventors: Arika Fukushima, Ota Tokyo (JP); Myungsook Ko, Ota Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1031 days.

(21) Appl. No.: 17/015,824

(22) Filed: Sep. 9, 2020

(65) Prior Publication Data

US 2021/0287134 A1 Sep. 16, 2021

(30) Foreign Application Priority Data

Mar. 13, 2020 (JP) ................................ 2020-044457

(51) Int. Cl.
*G06N 20/00* (2019.01)
*G06F 17/18* (2006.01)

(52) U.S. Cl.
CPC ............. *G06N 20/00* (2019.01); *G06F 17/18* (2013.01)

(58) Field of Classification Search
CPC ................................ G06N 20/00; G06F 17/18
See application file for complete search history.

(56) References Cited

U.S. PATENT DOCUMENTS

| | | | | |
|---|---|---|---|---|
| 10,636,007 B2 | 4/2020 | Runkana et al. | | |
| 2006/0224543 A1* | 10/2006 | Clymer | G06N 5/025 | 706/47 |
| 2010/0070441 A1* | 3/2010 | Yuta | G06N 20/00 | 702/179 |

FOREIGN PATENT DOCUMENTS

| | | | | |
|---|---|---|---|---|
| JP | 2004258991 A * | 9/2004 | G06F 17/18 |
| JP | 3897169 B2 * | 3/2007 | |
| JP | 2009266158 A * | 11/2009 | G06F 17/18 |
| JP | 5331774 B2 | 10/2013 | |
| JP | 2018-195308 A | 12/2018 | |
| JP | 2019-18755 A | 2/2019 | |
| JP | 2019-36112 A | 3/2019 | |
| WO | WO-03085548 A1 * | 10/2003 | G16B 25/00 |
| WO | WO 2019/016996 A1 | 1/2019 | |

* cited by examiner

*Primary Examiner* — Shahid K Khan
(74) *Attorney, Agent, or Firm* — Finnegan, Henderson, Farabow, Garrett & Dunner, LLP

(57) ABSTRACT

According to one embodiment, an information processing apparatus includes: a difference calculator configured to calculate, based on a plurality of data items each including an objective variable and at least one explanatory variable, a plurality of differences between the objective variable and prediction values of the objective variable predicted from the explanatory variable; a candidate generator configured to generate at least one division condition candidate which divides the explanatory variable into a plurality of sections; and a division condition selector configured to select a first division condition from the at least one division condition candidate, based on the differences calculated by the difference calculator.

16 Claims, 22 Drawing Sheets

| INSTANCE ID | OBJECTIVE VARIABLE | EXPLANATORY VARIABLE_1 | ··· | EXPLANATORY VARIABLE_i | ··· | EXPLANATORY VARIABLE_p |
|---|---|---|---|---|---|---|
| 1 | 53.5 | 1.6 | ··· | A | ··· | 1 |
| 2 | 24.7 | 4.2 | ··· | A | ··· | 3 |
| 3 | 42.6 | 8.2 | ··· | B | ··· | 5 |
| 4 | 42.1 | 5.7 | ··· | A | ··· | 5 |
| ··· | ··· | ··· | ··· | ··· | ··· | ··· |
| n | 96.2 | 9.1 | ··· | C | ··· | 2 |

| CLEANSING ID | EXPLANATORY VARIABLE | THRESHOLD | CLEANSING CONDITION | NEXT ID |
|---|---|---|---|---|
| 1 | EXPLANATORY VARIABLE_1 | 47.1 | EXPLANATORY VARIABLE_1 <47.1 | NULL |

FIG. 4A

| CLEANSING ID | EXPLANATORY VARIABLE | THRESHOLD | CLEANSING CONDITION | NEXT ID |
|---|---|---|---|---|
| 1 | EXPLANATORY VARIABLE_1 | 47.1 | EXPLANATORY VARIABLE_1 <47.1 | 2 |
| 2 | EXPLANATORY VARIABLE_P | 4.5 | EXPLANATORY VARIABLE_P>=4.5 | NULL |

FIG. 4B

| CLEANSING ID | EXPLANATORY VARIABLE | THRESHOLD | CLEANSING CONDITION | NEXT ID |
|---|---|---|---|---|
| 1 | EXPLANATORY VARIABLE_1 | 47.1 | EXPLANATORY VARIABLE_1 <47.1 | 2 |
| 2 | EXPLANATORY VARIABLE_P | 4.5 | EXPLANATORY VARIABLE_P>=4.5 | 3 |
| … | … | … | | … |
| m | EXPLANATORY VARIABLE_i | C | EXPLANATORY VARIABLE _i≠C | NULL |

FIG. 5

| CLEANSING ID | EXPLANATORY VARIABLE | THRESHOLD | CLEANSING CONDITION 1 | NEXT CLEANSING ID1 | CLEANSING CONDITION 2 | NEXT CLEANSING ID2 |
|---|---|---|---|---|---|---|
| 1 | EXPLANATORY VARIABLE _1 | 47.1 | EXPLANATORY VARIABLE _1<47.1 | 2 | EXPLANATORY VARIABLE _1>=47.1 | 4 |
| 2 | EXPLANATORY VARIABLE _p | 4.5 | EXPLANATORY VARIABLE _p>=4.5 | 3 | NA | NA |
| … | … | … | … | … | … | … |
| m | EXPLANATORY VARIABLE _i | C | EXPLANATORY VARIABLE _i≠C | NULL | NA | NA |

FIG. 15

| MODEL ID | MODEL PARAMETER 1 | ··· | MODEL PARAMETER p |
|---|---|---|---|
| A | 1.5 | ··· | -3.2 |
| B | 4.1 | ··· | -0.2 |
| ··· | ··· | ··· | ··· |
| Z | -6.3 | ··· | 9.8 |

| CLEANSING ID | EXPLANATORY VARIABLE | THRESHOLD | CLEANSING CONDITION 1 | NEXT ID1 | CLEANSING CONDITION 2 | NEXT ID2 |
|---|---|---|---|---|---|---|
| 1 | EXPLANATORY VARIABLE _1 | 47.1 | EXPLANATORY VARIABLE _1<47.1 | 2 | NA | NA |
| 2 | EXPLANATORY VARIABLE _p | 4.5 | EXPLANATORY VARIABLE _p>=4.5 | 3 | EXPLANATORY VARIABLE _p<4.5 | 4 |
| … | … | … | … | … | … | … |
| m | EXPLANATORY VARIABLE _i | C | EXPLANATORY VARIABLE _i≠C | A | EXPLANATORY VARIABLE _i=C | B |

FIG. 23

INFORMATION PROCESSING APPARATUS, INFORMATION PROCESSING METHOD, AND COMPUTER PROGRAM

CROSS REFERENCE TO RELATED APPLICATIONS

This application is based upon and claims the benefit of priority from the prior Japanese Patent Application No. 2020-044457, filed on Mar. 13, 2020, the entire contents of which are incorporated herein by reference.

FIELD

Embodiments described herein relate to an information processing apparatus, an information processing method, and a computer program.

BACKGROUND

A model learning method through a data-driven approach typified by artificial intelligence generates a model from preliminarily provided learning data. The accuracy of the generated model depends on the learning data. If a data item (anomalous instance) having a feature different from that of the learning data is mixedly included in the learning data, the accuracy of the model is reduced accordingly. Accordingly, before generation of the model using the learning data, a process of preliminarily removing an anomalous instance from the learning data is performed.

For example, an outlier is detected with reference to the distribution of an objective variable, and a learning data item including the outlier is removed. A cleansing condition for removing an outlier on the basis of previous knowledge is set, and only learning data items satisfying the cleansing condition are used.

However, also in a case where the objective variable is not an outlier, there is a possibility that an anomalous instance is present. Furthermore, the previous knowledge is required to generate the cleansing condition.

BRIEF DESCRIPTION OF THE DRAWINGS

FIGS. 4A and 4B show examples of a cleansing condition DB;

FIG. 5 shows an example where the cleansing condition DB is updated;

FIG. 15 shows an example of a cleansing condition DB according to this modified example 1;

FIG. 23 shows an example of a cleansing DB;

DETAILED DESCRIPTION

According to one embodiment, an information processing apparatus includes: a difference calculator configured to calculate, based on a plurality of data items each including an objective variable and at least one explanatory variable, a plurality of differences between the objective variable and prediction values of the objective variable predicted from the explanatory variable; a candidate generator configured to generate at least one division condition candidate which divides the explanatory variable into a plurality of sections; and a division condition selector configured to select a first division condition from the at least one division condition candidate, based on the differences calculated by the difference calculator.

Embodiments of the present invention are described below with reference to the drawings. In each diagram, elements having the same names are assigned the same symbols. Except enlarged or changed processes, the description is appropriately omitted.

First Embodiment

Figure 1:
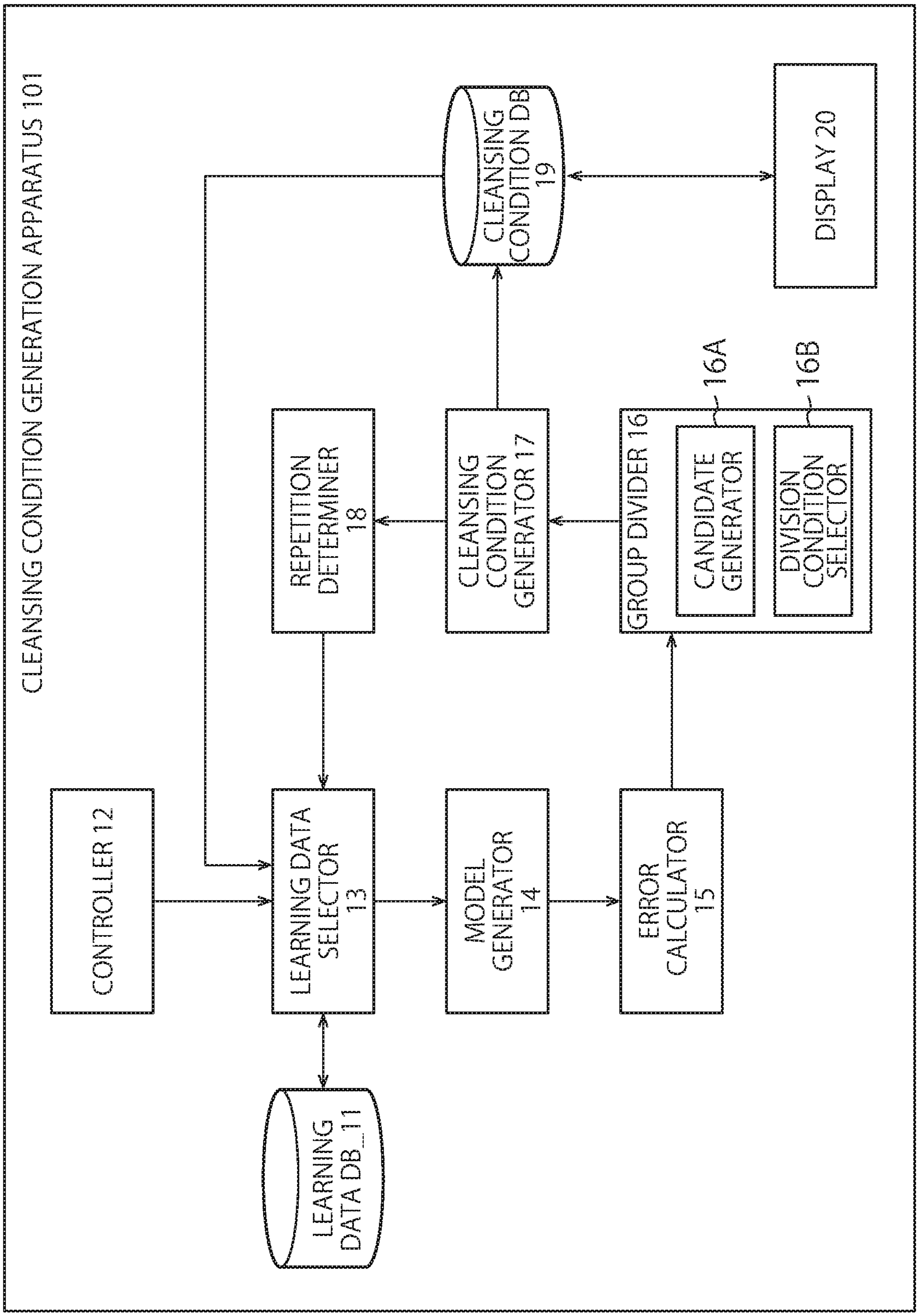
FIG. 1 is a block diagram of a cleansing condition generation apparatus that is an information processing apparatus according to a first embodiment.

FIG. 1 is a block diagram of a cleansing condition generation apparatus that is an information processing apparatus according to a first embodiment. The cleansing condition generation apparatus 101 in FIG. 1 includes, a learning data DB 11, a controller 12, a learning data selector (data selector) 13, a model generator 14, an error calculator (difference calculator) 15, a group divider 16, a cleansing condition generator (selection condition generator) 17, a repetition determiner 18, a cleansing condition DB 19, and a display 20. The group divider 16 includes a candidate generator 16A, and a division condition selector 16B.

The learning data DB 11 stores a plurality of instances as data for learning.

Figures 2, 3:
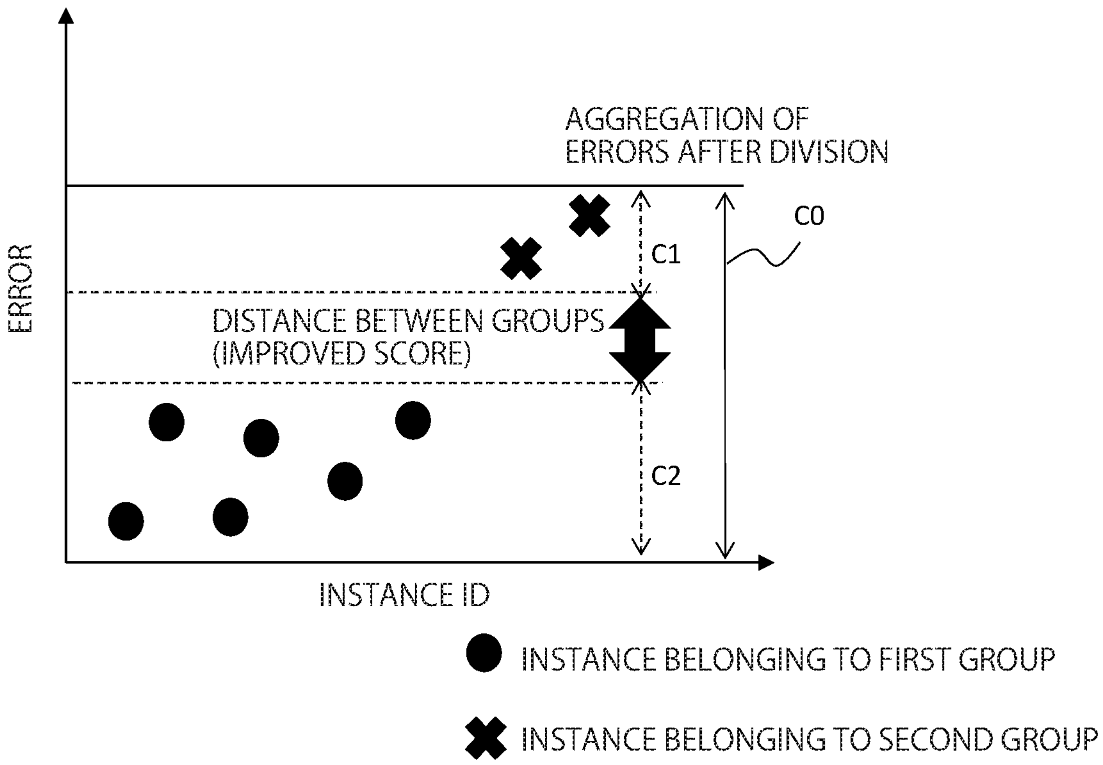
FIG. 2 shows an example of learning data stored in a learning data DB.
FIG. 3 schematically shows a concept of group division.

FIG. 2 shows an example of learning data stored in the learning data DB 11. The learning data is stored in a table format. The learning data includes a plurality of instances (data). The instance includes an instance ID, an objective variable, and "p" variables (explanatory variables). "p" is an integer of one or more. The value of the objective variable is a value of an observation target (true value). That is, the value of the objective variable is an actually measured or obtained value or the like. The instance ID is an ID that identifies an instance. In this embodiment, the objective variable is assumed as an real number. The value of the explanatory variable is assumed as a real number or a categorical value. The categorical value is, for example, "A", "B", "C" or the like, which are a value different from a numerical value. However, the objective variable may have a categorical value. In this case, the categorical value may be represented as a numerical value.

To represent the learning data, the objective variable, the explanatory variable, the instance and the like using symbols, the following definition is made.

Learning data (set of instances): $D=\{y,X\}$

Objective variable of learning data: $y=(y^{(1)}, \ldots, y^{(n)})^T$

The number of instances of learning data: $n$

Explanatory variable of learning data: $X=(x_1, \ldots, x_n)$; $x_j=(x)_j^{(i)}, \ldots, x_j^{(p)})^T$ The number of explanatory variables (=the number of dimensions): $p$ Instance: $d^{(i)}=\{y^{(i)},(x_i^{(i)}, \ldots, x_i^{(p)})\}$; $i=1, \ldots, n$ [Equation 1]

The observation target may be any target only if an observed value can be acquired, and may be a stock price, a traffic volume, a road occupancy, a use frequency of an MFP (Multi-function Printer), meteorological observables, a power demand amount, a power generation or the like. For example, in a case where the objective variable is the stock price of a certain company one month later, it can be considered that examples of the explanatory variable include the closing price of the stock of the company this day, the moving average of the stock price of the company over the last month, the trade volume over the last seven days and the like. In a case where the objective variable is the traffic volume (the number of vehicles/hour) at a certain location, or the occupancy of a certain road, the examples include the day of the week, weather, traffic jam information, presence or absence of a construction therearound and so on. In a case where the objective variable is meteorological observables (air temperature (° C.), precipitation (mm), or solar radiation intensity (W/m$^2$), etc.), it can be considered that the explanatory variable may be the meteorological observables each day in the past week, the meteorological observables on the same day last year or two years ago, the position of a cloud and so on. Likewise, also in a case where the objective variable is the use frequency of an MFP, the power demand amount, the power generation, etc., various explanatory variables can be considered.

The controller 12 controls the entire apparatus. For example, the operation of each element in this apparatus is controlled. The controller 12 may acquire an instance from an external apparatus, and store the acquired instance in the learning data DB 11. In this case, the controller 12 includes an instance acquirer that acquires an instance. The controller 12 may output a cleansing condition generated in this embodiment to an external apparatus. The controller 12 may output a division condition generated in this embodiment to an external apparatus.

The learning data selector (data selector) 13 acquires, from the learning data DB 11, instances satisfying a cleansing condition (instance selection condition) stored in the cleansing condition DB 19, described later. The learning data selector 13 provides the model generator 14 with the acquired instances as learning data. Each of the acquired instances are defined by $d^{(i)}$ described above. In the initial state, a case is allowed where the cleansing condition is not stored in the cleansing condition DB 19. In this case, the learning data selector 13 selects all the instances in the learning data DB 11.

As described later, the cleansing condition DB 19 is repetitively updated. The instances selected by the learning data selector 13 are changed according to the update of the cleansing condition DB 19.

The model generator 14 uses the learning data provided from the learning data selector 13 to generate a model for predicting the objective variable from the explanatory variable through machine learning. The model generator 14 provides the error calculator 15 with the generated model and with the learning data provided from the learning data selector 13.

For example, mod el: $f$ prediction value of model: $\hat{y}=(\hat{y}^{(1)}, \ldots, \hat{y}^{(n)})^T$ [Equation 2]

are used for representation, and the model generator 14 uses the learning data to calculate the parameter of the model f such that $$\hat{y}=f(X) \quad \text{[Equation 3]}$$

If the model f is a regression equation, the parameter is the coefficient of the regression equation.

The model can be generated through a typical machine learning method that solves a regression problem using training data. For example, the method may be multiple regression, GLM, neural network, regression tree, model tree, random forest, boosting, deep learning, etc. Not only the machine learning method, but also a typical statistical value (average, median, mode, maximum value, minimum value, 25 percentile, or 75 percentile) may be generated as a model. The model generated by the model generator 14, and the learning data are provided for the error calculator 15.

The error calculator 15 uses the model provided by the model generator 14, and the explanatory variable of the learning data provided by the model generator 14, to calculate the prediction value (the output value of the model) of the objective variable. The error calculator 15 calculates an error that is the difference between the prediction value of the objective variable and the true value (observed value) of the objective variable. The error calculator 15 provides the calculated error, and the learning data for the group divider 16.

The error, and a function of calculating the error (error calculation function) can be represented as follows using symbols.

difference between prediction value of objective variable and true value (error): $\varepsilon=(\varepsilon^{(1)}, \ldots, \varepsilon^{(n)})^T$; $\varepsilon^{(i)}=g(\hat{y}^{(i)}, y^{(i)})$ error calculation function: $g$ [Equation 4]

Specific examples of the error include the normal error, absolute error, square error, and relative error. It is assumed that the true value of the objective variable of the i-th instance, $y^{(i)}$ [Equation 5]

and the prediction value of the objective variable is $\hat{y}^{(i)}=f(x_1^{(i)}, \ldots, x_p^{(i)})$ [Equation 6]

the four errors of the i-th instance can be represented by the following equation. In this embodiment, any of the errors may be used.

[Equation 7]

(Error Example 1) normal error: $\varepsilon^{(i)} = \hat{y}^{(i)} - y^{(i)}$ (Error Example 2) absolute error: $\varepsilon^{(i)} = \left|\hat{y}^{(i)} - y^{(i)}\right|$ (Error Example 3) square error: $\varepsilon^{(i)} = \left(\hat{y}^{(i)} - y^{(i)}\right)^2$ (Error Example 4) realative error: $\varepsilon^{(i)} = \dfrac{\hat{y}^{(i)} - y^{(i)}}{y^{(i)}}$ The group divider 16 determines the explanatory variable serving as a target of dividing the learning data, and the reference value of division (division reference value) as the division condition, on the basis of the error provided by the error calculator 15. In a case where the explanatory variable is a real number, the division reference value is a threshold. Hereinafter, a threshold is mainly assumed. Provided that the explanatory variable to be divided is $x_j$ and the threshold is $\theta_k$, the division condition is a condition for dividing the explanatory variable into a plurality of sections with the threshold $\theta_k$. The learning data is divided into a group with the explanatory variable $x_j$ being less than $\theta_k$, and a group with the variable being equal to or larger than $\theta_k$. In a case where the explanatory variable is a categorical value, the division condition is a condition for dividing the explanatory variable x, to be divided into a group coinciding with the division reference value, and a group not coinciding. The group divider 16 provides the cleansing condition generator 17 with the generated division condition, and the learning data acquired from the error calculator 15. Hereinafter, the details of the group divider 16 are described. The group divider 16 includes the candidate generator 16A, and the division condition selector 16B.

The candidate generator 16A of the group divider 16 selects the explanatory variable (for example, the j-th explanatory variable: $x_j$) serving as a target for the learning data. For the explanatory variable serving as a target, at least one candidate of the division reference value (threshold or the like) is generated. A plurality of division reference values in this example are generated. A method of generating the candidate of the division reference values is described according to a case where the explanatory variable is a real number value and a case where the explanatory variable is a categorical value, in an divided manner.

(Case where explanatory variable serving as target is real number value)

All the values of the explanatory variable serving as a target are extracted, and the extracted values are sorted in an descending order (or an ascending order). If extracted values are redundant, the redundant values are excluded. The sorted value is represented as $x'=\{x_1', x_2', \ldots, x_L'\}$ [Equation 8]

(L is the total number of values that are not redundant)

The following candidate example 1 or 2 are used to generate a candidate of a division reference value (here, a threshold),

[Equation 9]

(Threshold candidate example 1) average:

$$\text{one candidate of threshold} = \frac{x_l' + x_{l+1}'}{2}$$

(Threshold candidtate example 2) moving average:

$$\text{one candidate of threshold} = \frac{x_d' + \ldots + x_{d+h}'}{1+h}$$

("$d$" can be freely set)

(Case where Explanatory Variable Serving as Target is Categorical Value)

All the categorical values of the explanatory variable are extracted, and all the extracted categorical values are adopted as the candidates of the division reference value. For example, in a case where there are "A", "B" and "C" as categorical values of the explanatory variables serving as targets in the learning data, all the "A", "B" and "C" are adopted as the candidates of the division reference values. Other methods include a method of adopting "X" categorical values ("X" is designated in a setting file) having higher frequencies, as the candidates of the division reference value.

Similar to the case of the categorical value, also in the case where the explanatory variable is a real number value, all the values of the explanatory variables can be adopted as the candidates of the threshold.

The candidate generator 16A of the group divider 16 sequentially selects all the explanatory variables in the learning data as the explanatory variables serving as targets, and creates one or more candidates of the threshold for each explanatory variable serving as a target.

The division condition selector 16B of the group divider 16 divides the learning data with respect to every pair of the explanatory variable and the threshold candidate, and calculates an improved score for the corresponding pair. The improved score according to the j-th explanatory variable and the k-th threshold candidate is represented as $o_{j,k}$. An example of calculating the improved score is described.

Examples of calculating the dispersion of the errors before and after division as the improved score are described as the following examples 1 and 2.

[Equation 10]

(Improved score example 1) use of standard deviation:

$$o_{j,k} = sd(\varepsilon) - \sum_{g\in\{left,right\}} \frac{|\varepsilon_g|}{|\varepsilon|} sd(\varepsilon_g)$$

-continued $sd$: function of calculating standard deviation and unbiased standard deviation.

(Improved score example 2) use of variance:

$$o_{j,k}=\text{var}(\varepsilon)-\sum_{g\in\{left,right\}}\frac{|\varepsilon_g|}{|\varepsilon|}\text{var}(\varepsilon_g)$$

var: function of calculating variance where $$\text{error}:\varepsilon=\{\varepsilon^{(1)},\varepsilon^{(2)},\ldots,\varepsilon^{(n)}\}\quad\text{[Equation 11]}$$

and it is assumed that for the j-th explanatory variable $x_j$, with the k-th threshold candidate $$\theta_k\quad\text{[Equation 12]}$$

the learning data is divided into two groups, a set of errors of instances included in the first group is $$\varepsilon_{left}=\{\varepsilon^{(l)};l\in L;L\text{ is index of instance}\},\quad\text{[Equation 13]}$$

and a set of errors of instances included in the second group is $$\varepsilon_{right}=\{\varepsilon^{(r)};r\in R;R\text{ is index of instance}\},\quad\text{[Equation 14]}$$

where "l" and "r" have a reciprocal relationship.

Examples of calculating, as the improved score, an aggregation of errors that is a divided group include the following examples 3 and 4.

(Improved score example 3) use of reachable distance: $o_{j,k}=\min(\varepsilon_{right})-\max(\varepsilon_{left})$ provided that $\bar{\varepsilon}_{left}<\bar{\varepsilon}_{right}$ [Equation 15]

where the average of the errors of the first group is $$\bar{\varepsilon}_{left}\quad\text{[Equation 16]}$$

and the average of the errors of the second group is $$\bar{\varepsilon}_{right}\quad\text{[Equation 17]}$$

(Improved score example 4) distance between groups: $o_{j,k}=|\bar{\varepsilon}_{right}-\bar{\varepsilon}_{left}|$ [Equation 18]

The improved score is not limited to the examples 1 to 4 described above. Alternatively, the improved score may be an indicator that evaluates the improvement degree of the dispersion of the errors before and after the division, or an indicator that evaluates an aggregation as a group after division.

The improvement degree may be evaluated using an indicator that evaluates the coincidence degree between true values, which have a concept opposite to that of errors, and estimate values, or an indicator that evaluates of applicability to the model. Hereinafter, examples of indicators that evaluate the coincidence degree and the applicability.

true value of objective variable: $y=\{y^{(1)},y^{(2)},\ldots,y^{(n)}\}$ estimate value: $\hat{y}=\{\hat{y}^{(1)},\hat{y}^{(2)},\ldots,\hat{y}^{(n)}\}$ [Equation 19]

are assumed. The set of true values of the first group after division is $$y_{left}=\{y^{(l)};l\in L;\ L\text{ is index of instance}\},\quad\text{[Equation 20]}$$

and the set of estimate values of the first group after division is $$\hat{y}_{left}=\{\hat{y}^{(l)};l\in L\},\quad\text{[Equation 21]}$$

The set of true values in the second group after division is $$y_{right}=\{y^{(r)};r\in R;R\text{ is index of instance}\},\quad\text{[Equation 22]}$$

and the estimate value of true value in the second group is $$\hat{y}_{right}=\{\hat{y}^{(r)};r\in R\},\quad\text{[Equation 23]}$$

As an indicator that measures the coincidence degree between the true value and the estimate value, an example of calculating the improved score according to the correlation coefficient is described in the following example 5. An example of calculating the improved score with the determination coefficient, as an indicator that evaluates the applicability to the model is described in the following example 6.

(Improved score example 5) indicator using correlation coeffcient: [Equation 24]

$$o_{j,k}=-\sum_{g\in\{left,right\}}\frac{|y_g|}{|y|}cor(y_g,\hat{y}_g)-cor(y,\hat{y})$$

Cor: function of calcuating correlation coefficent (Improved score example 6) indicator using determination coefficent:

$$o_{j,k}=-\sum_{g\in\{left,right\}}\frac{|y_g|}{|y|}r2(y_g,\hat{y}_g)-r2(y,\hat{y})$$

$r2$: function of calcuating determination coefficent

The division condition selector 16B calculates the improved score for all the pairs of the explanatory variables and the threshold candidates. Based on the improved score, one pair of the explanatory variable and the threshold candidate is selected. For example, the pair of the explanatory variable and the threshold candidate that has the highest improvement degree is selected. The selected pair is then selected as the division condition.

According to the definition of the improved score, there can be a case where the smaller the improved score is, the higher the improvement degree is, and a case where the larger the improved score is, the higher the improvement degree is. In the examples 1 to 6 described above, the larger the improved score is, the higher the improvement degree is.

FIG. 3 schematically shows a concept of group division. In this case, before division, the error is distributed in a range C0. After division, the error is distributed in a range C1 for the first group, and the error is distributed in a range C2 for the second group. A range that is coupling of the range C1 and the range C2 is smaller than the range C0. That is, the distance between the groups has a value larger than zero. Accordingly, the division improves the aggregation of the errors as a group, or the dispersion of errors. The range C1 includes instances having large errors. It can be considered that the division separates the instances in the range C1 having large errors from the group C0 before division.

The cleansing condition generator 17 divides the instances included in the learning data into the plurality of (two is assumed in this embodiment) sections in conformity with the division condition provided by the group divider 16. Based on the number of instances included in the sections, a first section is selected from among the sections. The condition (the condition specifying the first section) for selecting the instances belonging to the selected first section is generated as a cleansing condition. In further detail, this is as follows.

The cleansing condition generator 17 determines whether the group of the instances belonging to the sections individually satisfies an anomaly condition. The group satisfying the anomaly condition is called an anomalous group, and the instances included in the anomalous group are called anomalous instances, in some cases. The group that does not satisfy the anomaly condition is called a normal group, and the instances belonging to the normal group are called normal instances, in some cases.

Examples of the anomaly condition are described in the following examples 1 to 3. "α" is a value preset as a parameter.

(Anomaly condition example 1) anomaly condition using the number of instances in group: [Equation 25]

$$|D_g| < \alpha$$

$|D_g|$: the number of instances in group $g$ (Anomaly condition example 2) anomaly condition using the ratio of instances in group $g$:

$$\frac{|D_g|}{|D|} < \alpha$$

$|D|$: the entire number of instances before division (Anomaly condition example 3) anomaly condition using improved score:

$$o_{j,k} > \alpha$$

In a case where the condition in the example 3 is used and this condition is satisfied, for example, the groups where the number of instances is the smallest or is equal to or less than a predetermined value are assumed to satisfy the anomaly condition, and the other groups are assumed as normal groups.

In a case where both the anomalous group and the normal group are present among the groups obtained by division, the cleansing condition generator 17 generates the condition for selecting the normal group (the condition specifying the section to which the normal group belongs) as the cleansing condition. It can be regarded that the cleansing condition is a condition for selecting the normal instance, or a condition for excluding the anomalous instance.

When all the groups obtained by division are anomalous groups, the cleansing condition generator 17 does not generate the cleansing condition. For example, when both the two groups generated by division are the anomalous groups, the cleansing condition is not generated. In this case, it is determined that there is a possibility that the parameter "α" included in the anomaly condition is inappropriate. The controller 12 may transmit data or a signal issuing a warning, to a user who is an operator, an administrator or the like of this apparatus. The user having received the warning can review the parameter "α", for example. Alternatively, when all the groups obtained by division are determined as anomalous groups, the processing of this apparatus may be finished at the time of determination. At the time of finishing the processing, all the cleansing conditions stored in the cleansing DB 19 may be output.

In this embodiment, it is assumed that among the generated groups, one group is basically the anomalous group, and the other group is a normal group. Alternatively, both the groups are assumed as normal groups. When both the groups are the anomalous groups, a warning may be issued to the user and the processing of this apparatus may be finished as described above.

When the cleansing condition is generated, the cleansing condition generator 17 generates a cleansing ID for identifying the cleansing condition, and stores the cleansing ID, the division condition, the cleansing condition and the like in the cleansing DB 19, FIG. 4A shows an example of the cleansing condition DB 19. FIG. 4A shows an example where the first cleansing condition is stored. The column of the cleansing ID stores the cleansing ID. The column of the explanatory variable stores an ID for identifying the explanatory variable used for the division condition. The column of the threshold (division reference value) stores the threshold (division reference value) of the division condition. The pair of the explanatory variable and the threshold corresponds to the division condition. In the example of the diagram, a division condition including a pair of "EXPLANATORY VARIABLE_1" and a threshold "47.1" is recorded.

The column of the cleansing condition stores, as the cleansing condition, a condition specifying the section to which the normal group belongs (the condition for selecting the normal group) among the plurality of (two in this case) sections divided with the division condition. For example, "EXPLANATORY VARIABLE_1<47.1" is a section having "EXPLANATORY VARIABLE_1" less than "47.1". That is, "EXPLANATORY VARIABLE_1<47.1" means selection of instances having "EXPLANATORY VARIABLE 1" smaller than "47.1". In other words, "EXPLANATORY VARIABLE_1<47.1" means that instances having "EXPLANATORY VARIABLE_1" of "47.1" or more are excluded as anomalous instances.

The column of "NEXT ID" stores the cleansing ID of the cleansing condition to be applied subsequent to the normal group (group selected with the cleansing condition). Accordingly, cleansing conditions to be sequentially applied can be managed in association with each other. In the example of the diagram, a second cleansing condition has not been stored yet. Accordingly, the column of the next ID stores "NULL". The anomalous group is hereafter excluded from target instances to be selected by the learning data selector 13.

In the next process of the cleansing condition generator 17, at timing when the next cleansing condition is stored in the cleansing DB 19, "NULL" is replaced with the value of the cleansing ID of the next cleansing condition. For example, at timing when the cleansing condition with the cleansing ID=2 is added, "NULL" at "CLEANSING ID"="1" is replaced with "2".

FIG. 4B shows an example where at timing when the cleansing condition with the cleansing ID=2 is added, the next ID (=NULL) at "cleansing ID=1" is replaced with "2". Specifically, first, according to the cleansing condition with cleansing ID=1, instances are selected by the learning data selector 13. The selected instances are divided into two that are a section with a value less than 4.5 and a section with 4.5 or more according to the division condition ("EXPLANATORY VARIABLE_p" and "THRESHOLD" of "4.5") determined by the group divider 16. Among groups of instances belonging to the corresponding sections, the group belonging to the section with the value less than "4.5" is determined as an anomalous group, and the group with "4.5"

or more is determined as a normal group. Accordingly, the cleansing condition "EXPLANATORY VARIABLE_p >=4.5" specifying the section with "4.5" or more to which the normal group belongs is generated. The generated cleansing condition, cleansing ID=2, and the division condition are recorded in the cleansing condition DB 19. At this timing, the "NEXT ID" (="NULL") at "CLEANSING ID"="1" is replaced with "2". "NEXT ID" at "CLEANSING ID"="2" is "NULL" because no third cleansing condition is stored at this time point.

At timing when the cleansing condition with the cleansing ID=3 is added, "NULL" at "CLEANSING ID"="2" is replaced with "3" accordingly. Between the two groups divided according to the division condition with the cleansing ID=2, the instances in the group belonging to the section with the value less than "4.5" (anomalous group) are hereafter excluded from the target instances to be selected by the learning data selector 13.

The repetition determiner 18 determines whether to repeat (continue) the processes of the learning data selector 13 to the cleansing condition generator 17 or not based on a suspensive condition. When the suspensive condition is satisfied, it is determined to stop the process of generating the cleansing condition. In this case, a stop signal is transmitted to the learning data selector 13. On the contrary, when the suspensive condition is not satisfied, it is determined to repeat the process. In this case, the repetition determiner 18 transmits a signal instructing repetition to the learning data selector 13. Hereinafter, examples of the suspensive condition are described.

Suspensive Condition Example 1

The suspensive condition is defined using information on presence or absence of generating the cleansing condition. When the cleansing condition is generated by the cleansing condition generator 17, it is determined that the suspensive condition is not satisfied. When the cleansing condition is not generated, it is determined that the suspensive condition is satisfied. When satisfaction of the suspensive condition is determined using the information on presence or absence of generating the cleansing condition, the cleansing condition generator 17 provides the repetition determiner 18 with the information on presence or absence of generating the cleansing condition. The repetition determiner 18 determines the satisfaction of the suspensive condition on the basis of the provided information.

Suspensive Condition Example 2

The suspensive condition is defined using the improved score calculated by the group divider 16. If the improved score is less than the threshold, the suspensive condition is determined to be satisfied. That is, if the improved score is less than the threshold, the improvement effect of the accuracy of prediction of the model generated by the model generator 14 is determined to be low even if a cleansing condition is further generated. On the contrary, if the improved score is equal to or more than the threshold, it is determined that the suspensive condition is not satisfied. That is, it is determined that an improvement effect of the accuracy of prediction of the model due to further generation of a cleansing condition is determined to be expected. In the case of using the improved score, the cleansing condition generator 17 acquires the improved score from the group divider 16 and provides the score for the repetition determiner 18. The repetition determiner 18 determines the satisfaction of the suspensive condition on the basis of the provided improved score.

Suspensive Condition Example 3

The suspensive condition is defined using the number of repetitions. If the number of repetitions is equal to or more than a threshold, the suspensive condition is determined to be satisfied. On the contrary, if the number of repetitions is less than the threshold, it is determined that the suspensive condition is not satisfied. In this case, the cleansing condition generator 17 may provide the repetition determiner 18 with information on the number of repetitions. The repetition determiner 18 determines the satisfaction of the suspensive condition on the basis of the provided information. Alternatively, the repetition determiner 18 may store the number of repetitions in itself, and determine the satisfaction of the suspensive condition using the stored information.

The suspensive condition is not limited to the examples 1 to 3 described above. For example, when the number of generated cleansing conditions reaches a predetermined value, it may be determined that the suspensive condition is satisfied. When a signal of the suspensive instruction is received from the user's operation device, it may be determined that the suspensive condition is satisfied.

When the repetition determiner 18 determines to repeat the process, the learning data selector 13 selects the instance on the basis of all the cleansing conditions in the cleansing condition DB 19. For example, all the cleansing conditions are applied sequentially from the cleansing condition with the cleansing ID=1 stored in the cleansing DB 19, and all the instances satisfying the cleansing condition are selected. The selected instances are applied as learning data to the model generator 14. The operations thereafter are as described above. It may be configured that in the repetitive process, the group divider 16 does not select a candidate having the same division condition with no cleansing condition being generated.

FIG. 5 shows an example of repeating the processes of the learning data selector 13 to the cleansing condition generator 17 to update the cleansing condition DB 19. When the cleansing condition with the cleansing ID="m" on the last row is generated, the suspensive condition is satisfied. Accordingly, the next ID with the cleansing ID="m" is "NULL". That is, when the repetitive operation is finished owing to satisfaction of the suspensive condition or the like, "NULL" is inserted into the column of the next ID on the last row.

Figure 6:
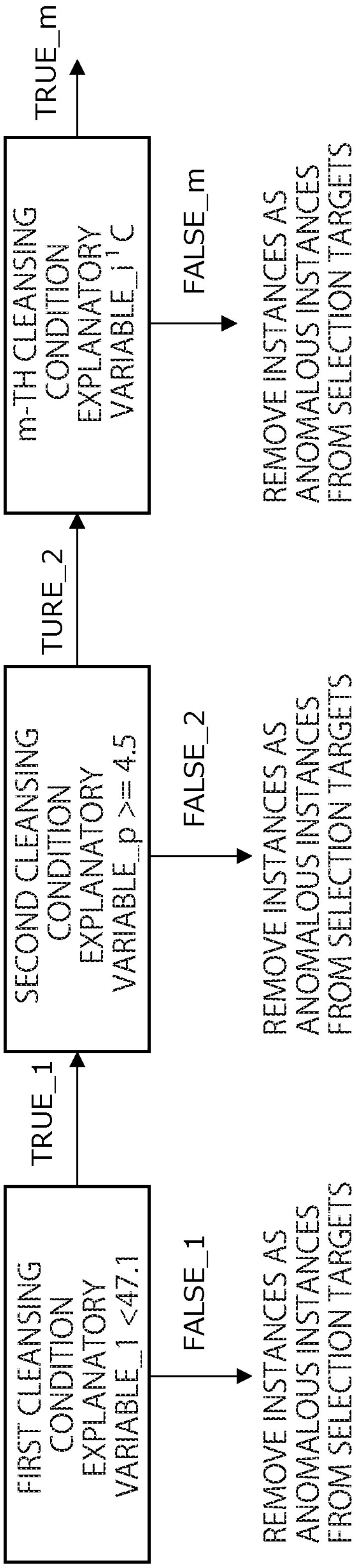
FIG. 6 supplementarily illustrates operations of a learning data selector.

FIG. 6 supplementarily illustrates the operations of the learning data selector 13. The illustration of FIG. 6 corresponds to the example of the cleansing condition DB 19 in FIG. 5.

It is assumed that first, only a cleansing condition with "EXPLANATORY VARIABLE_1<47.1" is registered in the cleansing condition DB 19 (see FIG. 4A). In this case, the learning data selector 13 selects only instances satisfying "EXPLANATORY VARIABLE_1<47.1" from the learning data DB 11 (TRUE_1), and provides the instances for the model generator 14. The instances that do not satisfy "EXPLANATORY VARIABLE_1<47.1" are regarded as anomalous instances and are not selected ("FALSE_1").

It is assumed that a cleansing condition with "EXPLANATORY VARIABLE_p >=4.5" is recorded by the cleansing condition generator 17, thus recording the second cleansing condition (see FIG. 4B) in the cleansing condition DB 19. In this case, the learning data selector 13 selects instances satisfying "EXPLANATORY VARIABLE_1<47.1" ("TRUE_1") from the learning data DB 11, and further selects instances satisfying "EXPLANATORY VARIABLE_p >=4.5" ("TRUE_2") from among the selected instances. The selected instances are provided for the model generator 14. The instances that do not satisfy both the two conditions are regarded as anomalous instances and are not selected ("FALSE_1" and "FALSE_2").

It is hereinafter assumed that the processes of the learning data selector 13 to the cleansing condition generator 17 are repeated, and "EXPLANATORY VARIABLE_i+C" is recorded as the m-th cleansing condition by the cleansing condition generator 17. At this time point, "m" cleansing conditions (see FIG. 5) are recorded in the cleansing condition DB 19. In this case, the learning data selector 13 applies the first to (m−1)-th cleansing conditions to the learning data DB 11, applies the m-th cleansing condition of "EXPLANATORY VARIABLE_i+C" to the remaining instances, and selects the instances ("TRUE_3"). The selected instances are provided for the model generator 14. The instances that do not satisfy the cleansing condition are regarded as anomalous instances and are not selected ("FALSE_3").

The display 20 displays, on a screen, the data stored in the cleansing condition DB 19. The user visually identifies the cleansing conditions generated by this apparatus and the other information (division condition etc.). The data stored in the cleansing condition DB 19 may be displayed after completion of the repetitive processes by this apparatus. Alternatively, the data in the cleansing condition DB 19 may be gradually displayed in real time, and a process of adding the cleansing condition and the like may be provided for the user.

Figure 7:
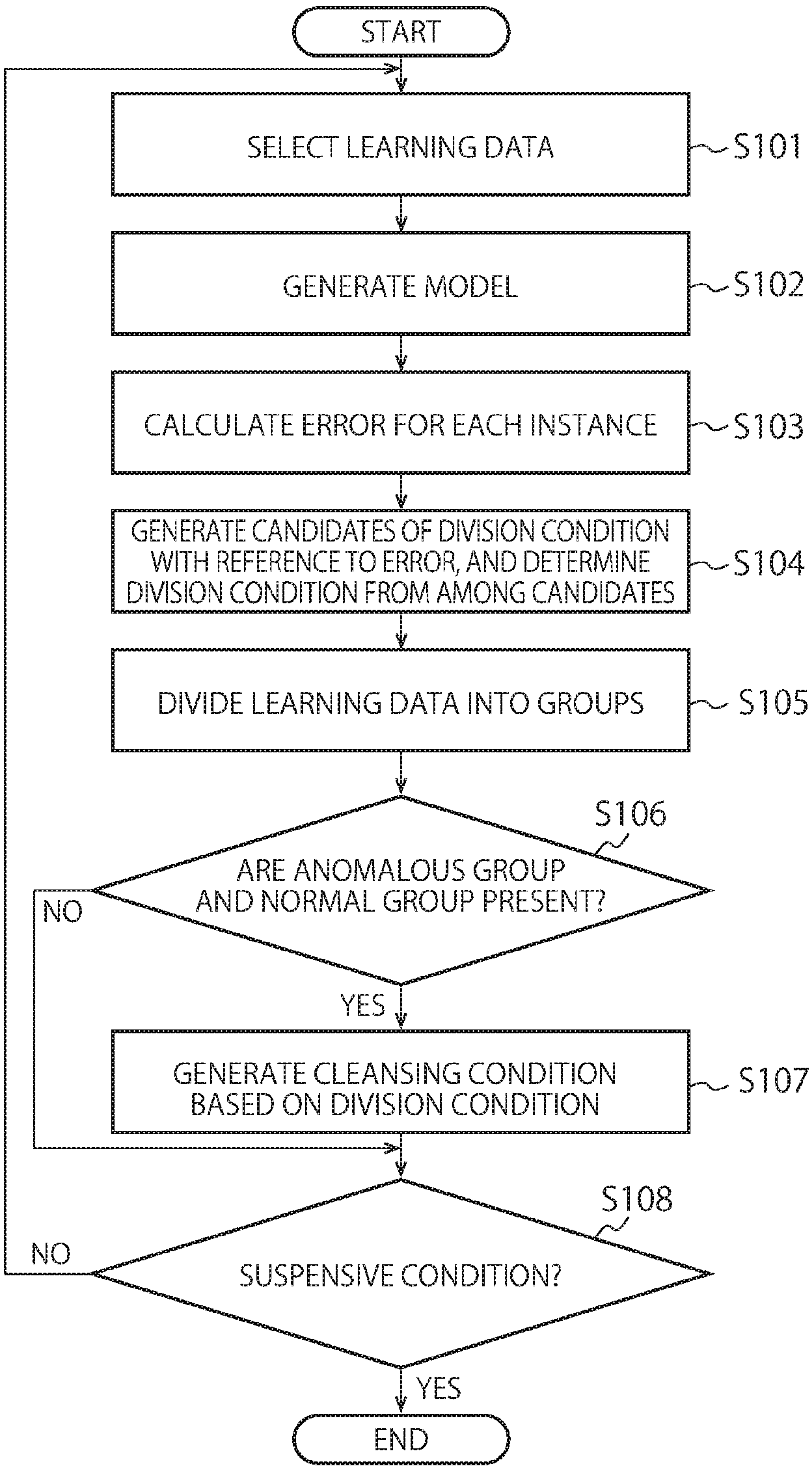
FIG. 7 is a flowchart showing an example of operations of the cleansing condition generation apparatus according to the first embodiment.

FIG. 7 is a flowchart showing an overview of an example of operations of the cleansing condition generation apparatus 101, which is the information processing apparatus according to the first embodiment. The operations of this flow are started when the controller 12 activates the learning data selector 13.

The learning data selector 13 acquires, from the learning data DB 11, the instances satisfying the cleansing conditions stored in the cleansing condition DB 19 as the learning data (S101). If no cleansing condition is stored in the cleansing condition DB 19, all the instances are acquired from the learning data DB 11.

The model generator 14 generates a model that predicts the objective variable from the explanatory variable on the basis of the learning data (S102).

The error calculator 15 calculates the error for each of the instances in the learning data on the basis of the generated model (S103).

The group divider 16 generates candidates of the division condition for dividing the learning data (one explanatory variable to be divided, and the division reference value (threshold or the like)) on the basis of the error calculated by the error calculator 15 (S104). One of the generated candidates is selected as the division condition.

The cleansing condition generator 17 divides the plurality of instances in the learning data into a plurality of (two in this case) sections according to the selected division condition (S105). The cleansing condition generator 17 determines whether the group of instances belonging to each section is the group (anomalous group) that satisfies the anomaly condition, or the group (normal group) that does not satisfy the anomaly condition (S106).

If only one group is the anomalous group and the other is the normal group, the condition for selecting the normal group (the condition specifying the section to which the normal group belongs) is generated as the cleansing condition (S107). The cleansing condition generator 17 associates the generated cleansing condition with the cleansing ID, and the division condition and the like, and stores the associated items in the cleansing condition DB. In this embodiment, if both the two groups are normal groups, no cleansing condition is generated. Note that as described in an after-mentioned modified example 1, a mode is allowed where if both the two groups are normal groups, cleansing conditions for the respective normal groups are generated.

The repetition determiner 18 determines whether the suspensive condition is satisfied (S108). If the suspensive condition is satisfied, repetition of the operations of steps S101 to S107 is determined. If the suspensive condition is not satisfied, the operations are finished.

Figure 8:
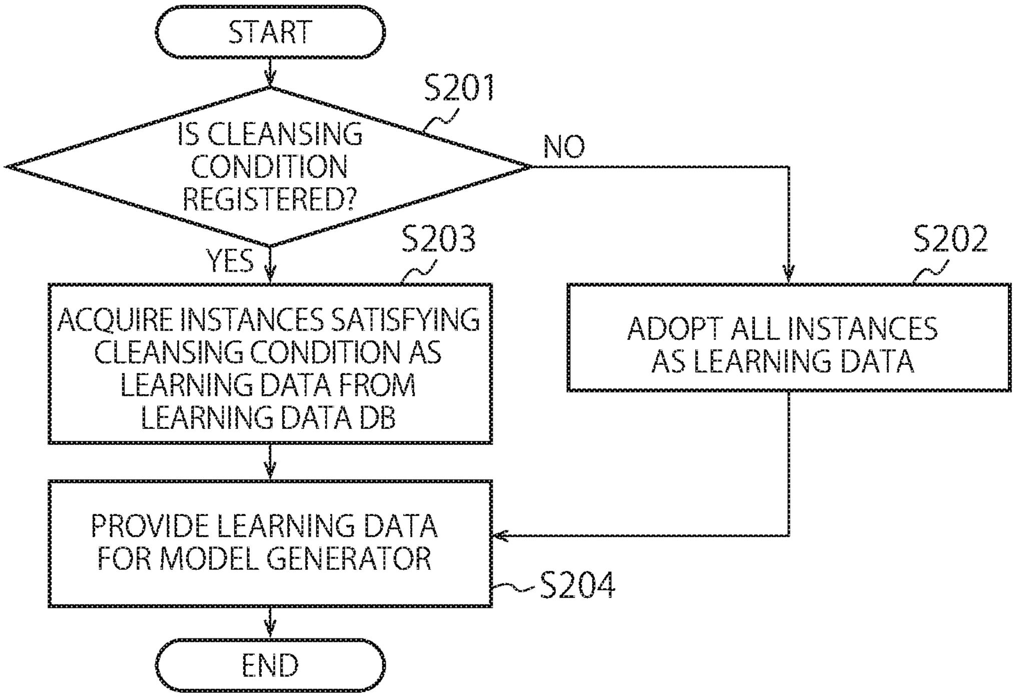
FIG. 8 is a flowchart showing an example of operations of the learning data selector.

FIG. 8 is a flowchart showing an example of operations of the learning data selector 13. The learning data selector 13 determines whether the cleansing condition is recorded in the cleansing condition DB 19 (S201). If no cleansing condition is registered (for example, in a case of an initial state), all the instances are acquired as the learning data from the learning data DB 11 (S202). On the contrary, if any cleansing condition is recorded in the cleansing condition DB 19, all the cleansing conditions are acquired from the cleansing condition DB 19, and the instances satisfying all the acquired cleansing conditions are acquired as the learning data from the learning data DB 11 (S203). The learning data selector 13 provides the model generator 14 with the learning data acquired in step S102 or S103 (S204).

Figure 9:
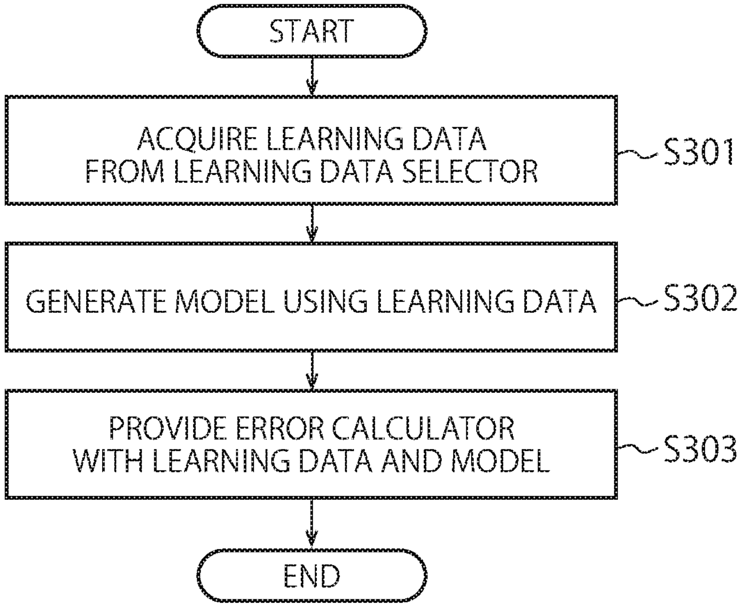
FIG. 9 is a flowchart of an example of operations of a model generator.

FIG. 9 is a flowchart of an example of operations of the model generator 14. The model generator 14 acquires the learning data from the learning data selector 13 (S301), and generates a model for predicting the objective variable from the explanatory variable using the acquired learning data (S302). The model is generated by, for example, through machine learning by a typical supervised method of solving a regression problem (multiple regression, GLM, neural network, regression tree, model tree, random forest, boosting, deep learning, etc.). Not only the machine learning, but also a typical statistical value (average, median, mode, maximum value, minimum value, 25 percentile, or 75 percentile) may be calculated as a model. The model generator 14 provides the error calculator 15 with the generated model and with the learning data acquired from the learning data selector 13 (S303).

Figure 10:
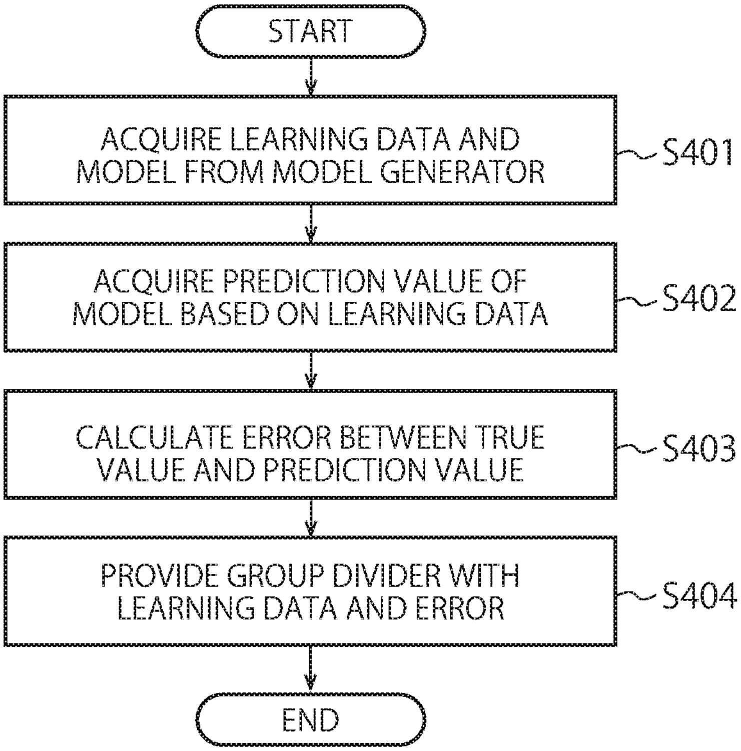
FIG. 10 is a flowchart of an example of operations of an error calculator.

FIG. 10 is a flowchart of an example of operations of the error calculator 15. The error calculator 15 acquires the learning data and the model from the model generator 14 (S401), and calculates the prediction value of the objective variable from the explanatory variable of the instance and the model (S402). The difference between the objective variable (true value) of the instance and the prediction value of the objective variable is calculated as the error (S403). As described above, the type of error may be a normal error, an absolute error, a square error, a relative error or the like. The error calculator 15 provides the group divider 16 with the learning data acquired from the model generator 14 and the error for each instance (S404).

Figure 11:
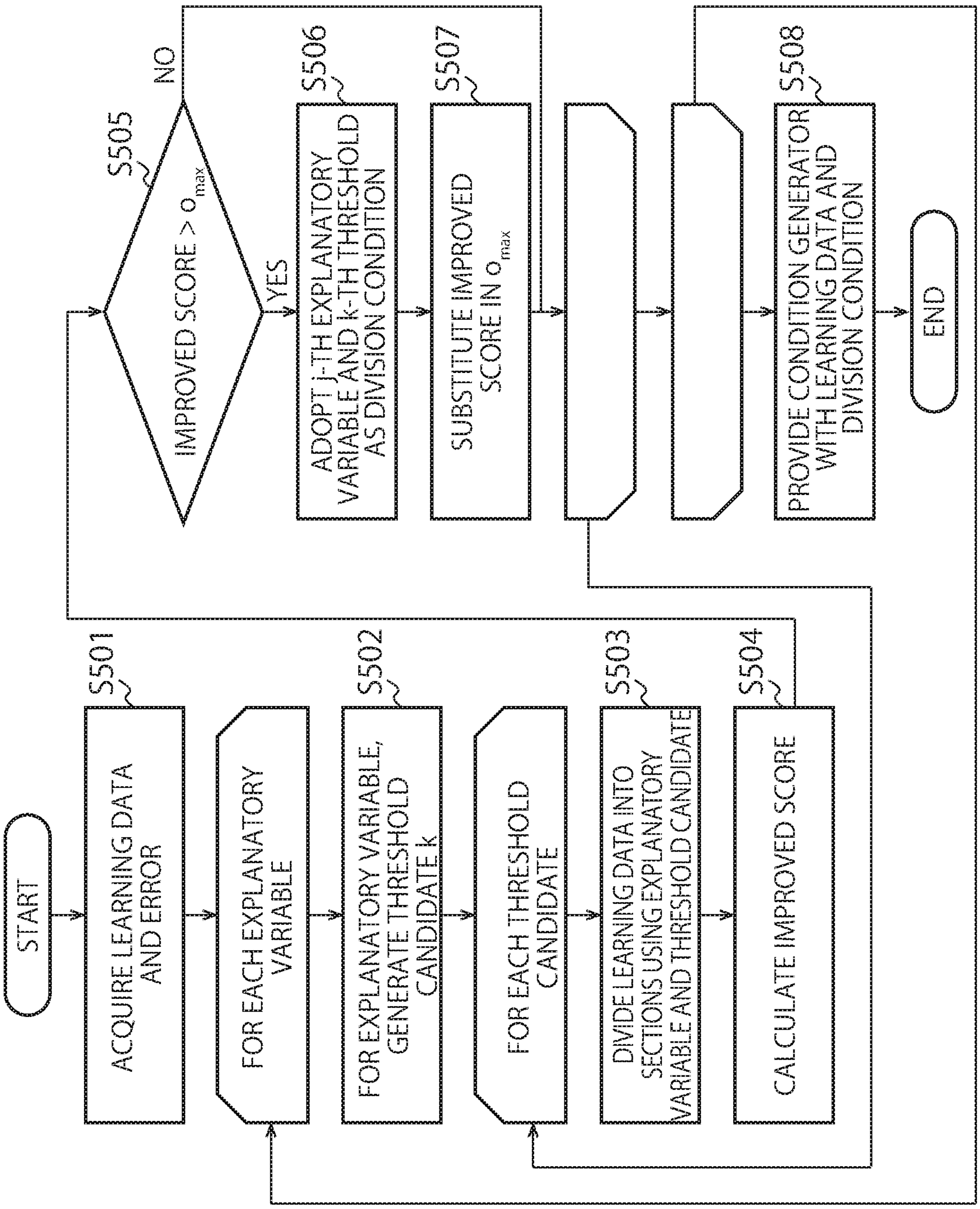
FIG. 11 is a flowchart of an example of operations of a group divider.

FIG. 11 is a flowchart of an example of operations of the group divider 16. The group divider 16 acquires the learning data and the error for each instance, from the error calculator 15 (S501). Based on the learning data, one explanatory variable is selected from among the explanatory variables, and at least one (multiple in this case) candidate of the threshold for dividing the value of the selected explanatory variable into a plurality of sections is generated (S502).

One candidate is selected, and based on the selected explanatory variable and the selected threshold candidate, the learning data is divided into sections (S503). Based on the errors of the instances belonging to each section, the improved score is calculated (S504). Examples of the improved score include the examples 1 to 6 of the improved score described above. It is determined whether the calculated improved score is higher than a preliminarily provided parameter "$o_{max}$" initial value is set) (S505). If the score is higher than the parameter "$o_{max}$", the selected explanatory variable and the threshold candidate are adopted as a temporary solution (temporary division condition) (S506). The improved score calculated in step S504 is substituted in the parameter "$o_{max}$" (S507).

After step S507, or if the improved score is determined to be less than the parameter "$o_{max}$" in step S505, the processing returns to step S502. A candidate having not been selected yet is selected from among the candidates generated in step S502, and similar processes are repeated (S503 to S507).

After all the threshold candidates are selected, the processing returns to step S502, and an explanatory variable having not been selected yet is selected. For the selected explanatory variable, at last one candidate (multiple candidates in this example) is generated, and each threshold candidate is sequentially selected, and similar processes are repeated (S503 to S507).

After all the explanatory variables are selected, the processing proceeds to step S508. In step S508, the temporary solution at this time point (temporary division condition) is fixedly determined as the final division condition. The cleansing condition generator 17 is provided with the fixedly determined division condition, and the learning data acquired from the error calculator 15.

Figure 12:
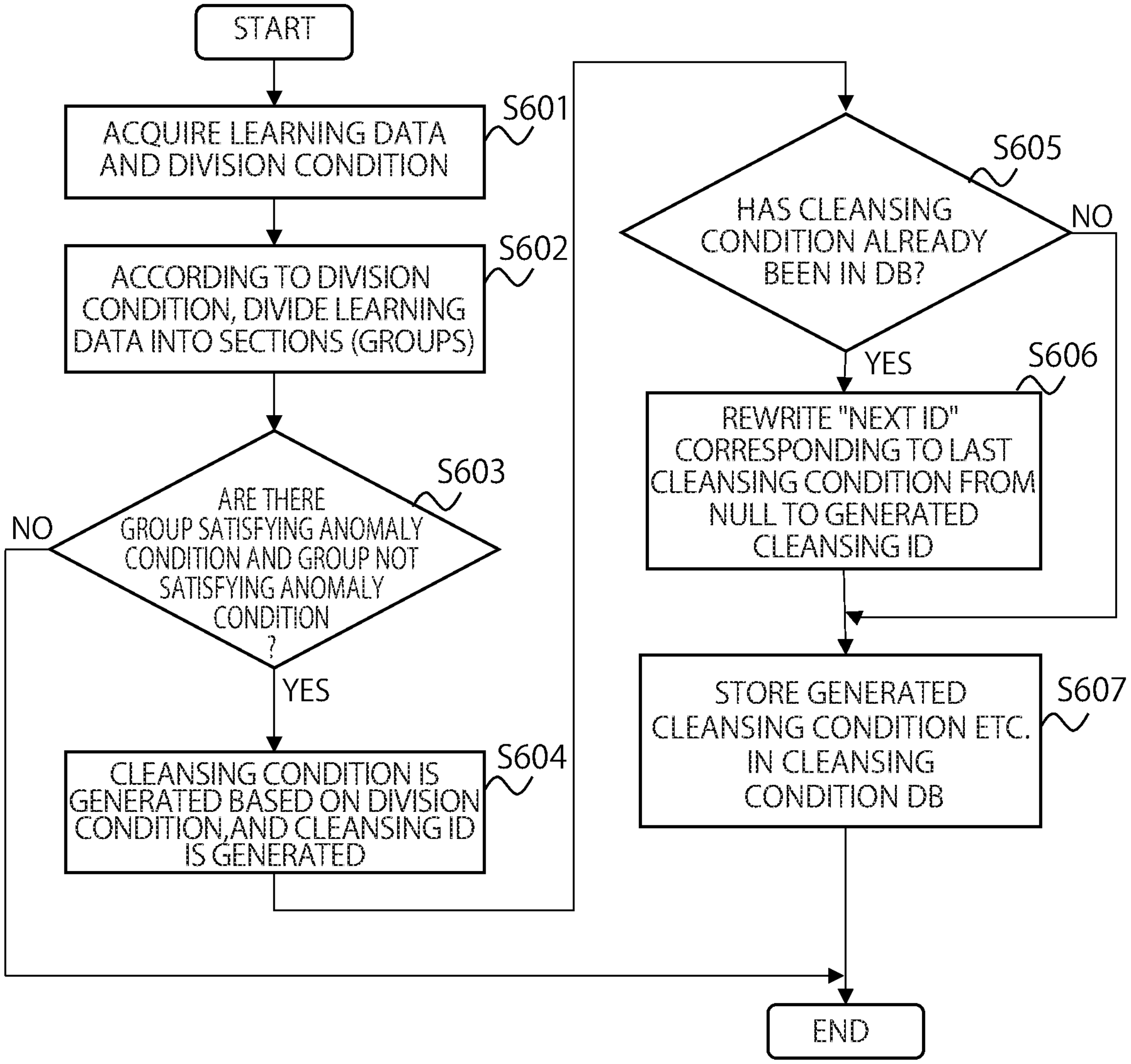
FIG. 12 is a flowchart of an example of operations of a cleansing condition generator.

FIG. 12 is a flowchart of an example of operations of the cleansing condition generator 17. The cleansing condition generator 17 acquires the learning data and the division condition from the group divider 16 (S601). The cleansing condition generator 17 divides the learning data into a plurality of sections according to the division condition (S602).

It is determined whether the group of instances belonging to each section is the anomalous group that satisfies the anomaly condition, or the normal group that does not satisfy the anomaly condition (S603). If all the groups are normal groups or all the groups are anomalous groups, this processing is finished. If all the groups are anomalous groups, a warning is issued to the user, and the processing of this apparatus (see FIG. 7) may be finished.

If there are anomalous groups and normal groups, the condition for selecting the instances in the section to which the normal group belongs (the condition specifying the section to which the normal group belongs) is generated as the cleansing condition (S604). A cleansing ID is generated for the cleansing condition (the same S604). It is determined whether another cleansing condition has already been recorded in the cleansing DB 19 (S605). If another cleansing condition has not been recorded yet, the cleansing condition is stored together with the cleansing ID and the division condition, in the cleansing DB 19 (S607). The value of "NEXT ID" is set to "NULL".

If another cleansing condition has already been recorded, the value of "NEXT ID" of the cleansing condition added last to cleansing DB 19 is rewritten from "NULL" to the value of the cleansing ID generated in step S604 (S606). The cleansing condition generated in step S604 is stored together with the cleansing ID, the division condition and the like, in the cleansing DB 19. The value of "NEXT ID" is set to "NULL".

Figure 13:
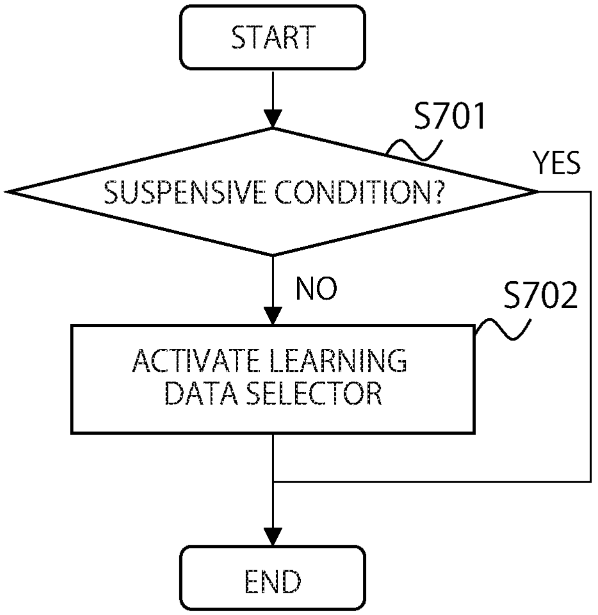
FIG. 13 is a flowchart of an example of operations of an repetition determiner.

FIG. 13 is a flowchart of an example of operations of the repetition determiner 18. After completion of the processes of the cleansing condition generator 17, the repetition determiner 18 determines whether the suspensive condition is satisfied (S701). If the suspensive condition is satisfied, the repetition determiner 18 finishes the processing of this apparatus (see FIG. 7). On the contrary, if the suspensive condition is not satisfied, the learning data selector 13 is reactivated (S702), and the processes of the flowchart of FIG. 8 are performed. The repetition determiner 18 may acquire information for determining satisfaction of the suspensive condition, from the cleansing condition generator 17. For example, when the satisfaction of the suspensive condition is determined based on the presence or absence of generating the cleansing condition in the cleansing condition generator 17, the information on presence or absence of generating the cleansing condition is acquired from the cleansing condition generator 17.

The cleansing condition stored in the cleansing condition DB 19 can be applied to a preprocess for the learning data when the prediction model is generated from the learning data. That is, only instances satisfying the cleansing condition in the cleansing condition DB 19 are selected from the learning data, and the selected instances are used to generate the prediction model. The learning data used to generate the prediction model may be learning data stored in the learning data DB 11, or learning data acquired separately.

Figure 14:
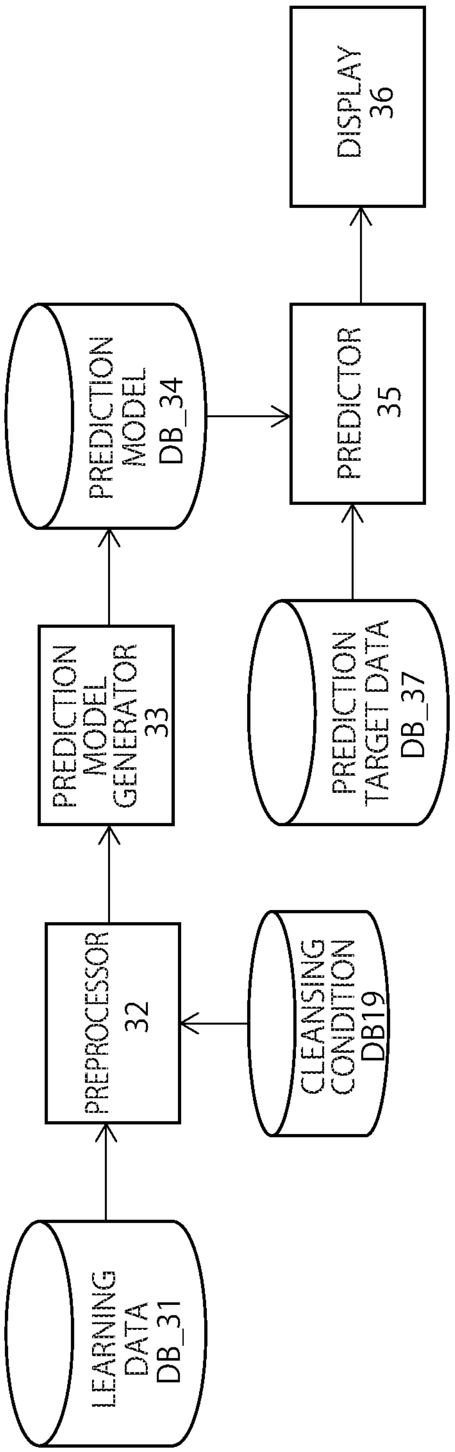
FIG. 14 is a block diagram of an example of a prediction apparatus according to this embodiment.

FIG. 14 is a block diagram of an example of a prediction apparatus that is an information processing apparatus according to this embodiment. The prediction apparatus in FIG. 14 includes a cleansing condition DB 19 that stores cleansing conditions generated by the cleansing condition generation apparatus 101 in FIG. 1. The prediction apparatus in FIG. 14 selects instances satisfying the cleansing condition from the learning data, and uses the selected instances to generate the prediction model, and to perform prediction based on the generated prediction model. In detail, the information processing apparatus in FIG. 14 includes a learning data DB 31, a preprocessor 32, a prediction model generator 33, a model DB 34, a predictor 35, a display 36, a prediction target data DB 37, and the cleansing condition DB 19.

The learning data DB 11 stores instances in the same form of that in the learning data DB 11 in FIG. 1. The learning data DB 31 may be the same as the learning data DB 11 in FIG. 1, or may store instances acquired separately from the learning data DB 11. The examples of explanatory variable and the objective variable may be similar to the examples described with the learning data DB 11.

The cleansing condition DB 19 is the same as the cleansing condition DB 19 that stores cleansing conditions generated by the cleansing condition generation apparatus 101 in FIG. 1.

The preprocessor 32 selects the instances satisfying all the cleansing conditions stored in the cleansing condition DB 19 from the learning data DB 31, and provides the selected instances for the prediction model generator 33.

The prediction model generator 33 generates the prediction model for predicting the objective variable from the explanatory variable on the basis of the instances provided by the preprocessor 32. The type of the prediction model may be similar to that of the model generated by the model generator 14 in FIG. 1.

The prediction target data DB 37 stores prediction target data including a plurality of explanatory variables pertaining to the observation target. The explanatory variables included in the prediction target data are of the same type in the learning data DB 31.

The predictor 35 calculates the prediction value pertaining to the observation target, based on the prediction target data stored in the prediction target data DB 37 and the prediction model stored in the model DB 34. Specifically, the explanatory variable of the prediction target data is input into the explanatory variable of the prediction model, and the prediction value of the objective variable is calculated.

The display 36 displays the prediction value calculated by the predictor 35. Accordingly, the user, such as the operator or the administrator, of this apparatus can verify the prediction result.

As described above, according to this embodiment, even in a case where the value of the objective variable of each instance in the learning data is not an outlier, a condition for eliminating instances (anomalous instances) having features different from those of the others in the learning data can be generated as the cleansing condition. According to this embodiment, a normal or an anomaly label is not necessarily preset for each instance. Consequently, without previous knowledge, the cleansing condition of the learning data can be generated. Furthermore, repetition of the process of generating the cleansing condition can achieve gradual improvement in the accuracy of the cleansing condition.

Modified Example 1

In the first embodiment, the cleansing condition for removing anomalous instances when the two types, which are the normal group and anomalous group, are generated (i.e., the cleansing condition for selecting the normal group) is generated. In this modified example 1, two or more normal groups are generated. Even when no anomalous group is generated, conditions for selecting the respective normal groups (conditions specifying sections to which the respective normal group belong) are generated as cleansing conditions.

FIG. 15 shows an example of a cleansing condition DB 19 according to this modified example 1. There are two pairs of the column of the cleansing condition and the column of the next ID. The conditions specifying the sections obtained by division with the division condition are stored in the columns of the respective cleansing conditions. For example, in a case where the division condition is "EXPLANATORY VARIABLE_1" and a threshold is "47.1", there are a section with "EXPLANATORY VARIABLE_1" less than "47.1" and a section with "47.1" or more. Conditions specifying the respective sections are respectively stored as cleansing conditions in the columns of cleansing conditions 1 and 2.

Similar to the first embodiment, when the group of instances belonging to the section is a normal group, the column of the next ID stores the value of the next cleansing ID (until the next cleansing condition is actually generated, the value of the column of the next ID is "NULL"). On the contrary, when the group of instances belonging to the section is an anomalous group, the column of the cleansing condition stores "NA", and the column of the next ID also stores "NA". For example, when the cleansing ID=1, both the group of instances belonging to the section with "EXPLANATORY VARIABLE_1" being less than "47.1", and the group of instances belonging to the section with "47.1" or more are normal groups. Accordingly, the columns of the next IDs store the next cleansing IDs of "2" and "4". On the contrary, when the cleansing ID=2, the group of instances belonging to the section with "EXPLANATORY VARIABLE_p" of "4.5" or more is a normal group, and the group of instances belonging to the section with a value less than "4.5" is an anomalous group. Accordingly, for the normal group, "3" that is the next cleansing ID is stored. For the anomalous group, "NA" is stored.

Figure 16:
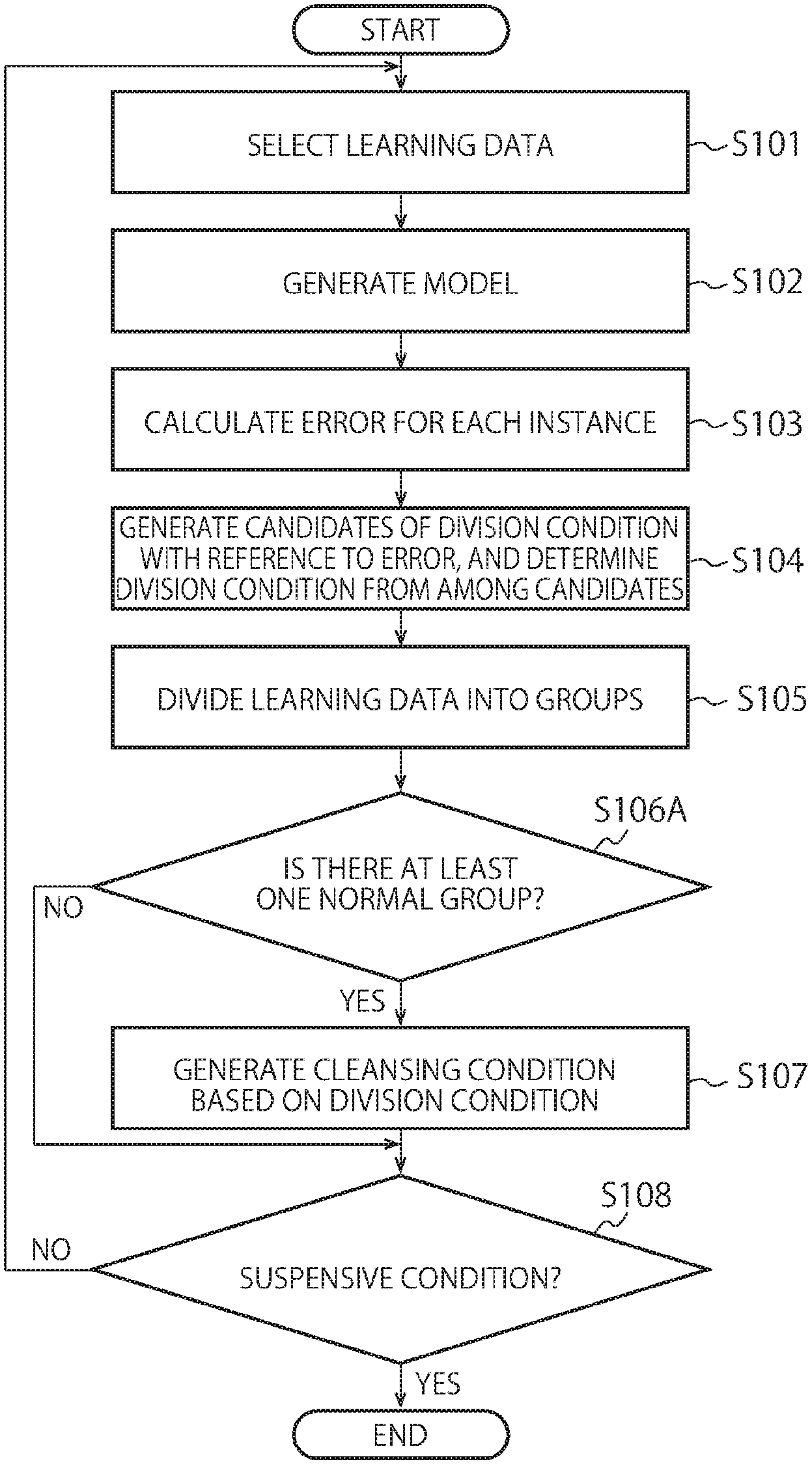
FIG. 16 is a flowchart showing an example of operations of a cleansing condition generation apparatus according to this modified example 1.

FIG. 16 is a flowchart showing an example of operations of a cleansing condition generation apparatus according to this modified example 1. In this processing, step S106 in the first embodiment is replaced with step S106A. In step S106A, it is determined whether the group of instances belonging to each of the sections divided with the division condition is an anomalous group or not. If there is at least one normal group (even if there is no anomalous group), the cleansing condition is generated.

According to this modified example 1, even if every group of instances belonging to each of the sections divided with the division condition is only a normal group, the cleansing condition is generated. Accordingly, for each normal group, a prediction model further in conformity with the features of the instances can be constructed.

Modified Example 2

In the first embodiment and the modified example 1, a mode with the division condition according to which the learning data is divided into two sections is shown. Alternatively, a division condition for division into three or more sections can be adopted. For example, a division condition for division into three sections that are a section with "EXPLANATORY VARIABLE_k" less than 50, a section with that of 50 or more and less than 60, and a section with that equal to or more than 60 can be adopted. Alternatively, a division condition for division into "EXPLANATORY VARIABLE_q"="A", "EXPLANATORY VARIABLE_q"="B", and "EXPLANATORY VARIABLE_q"="C" is also adopted.

For example, similar to the modified example 1, also in this case, pairs of the columns of cleansing conditions and the columns of the next IDs as many as the maximum number of sections, may be provided in the cleansing condition DB 19, and processes similar to those of the modified example 1 may be performed.

Second Embodiment

Figure 17:
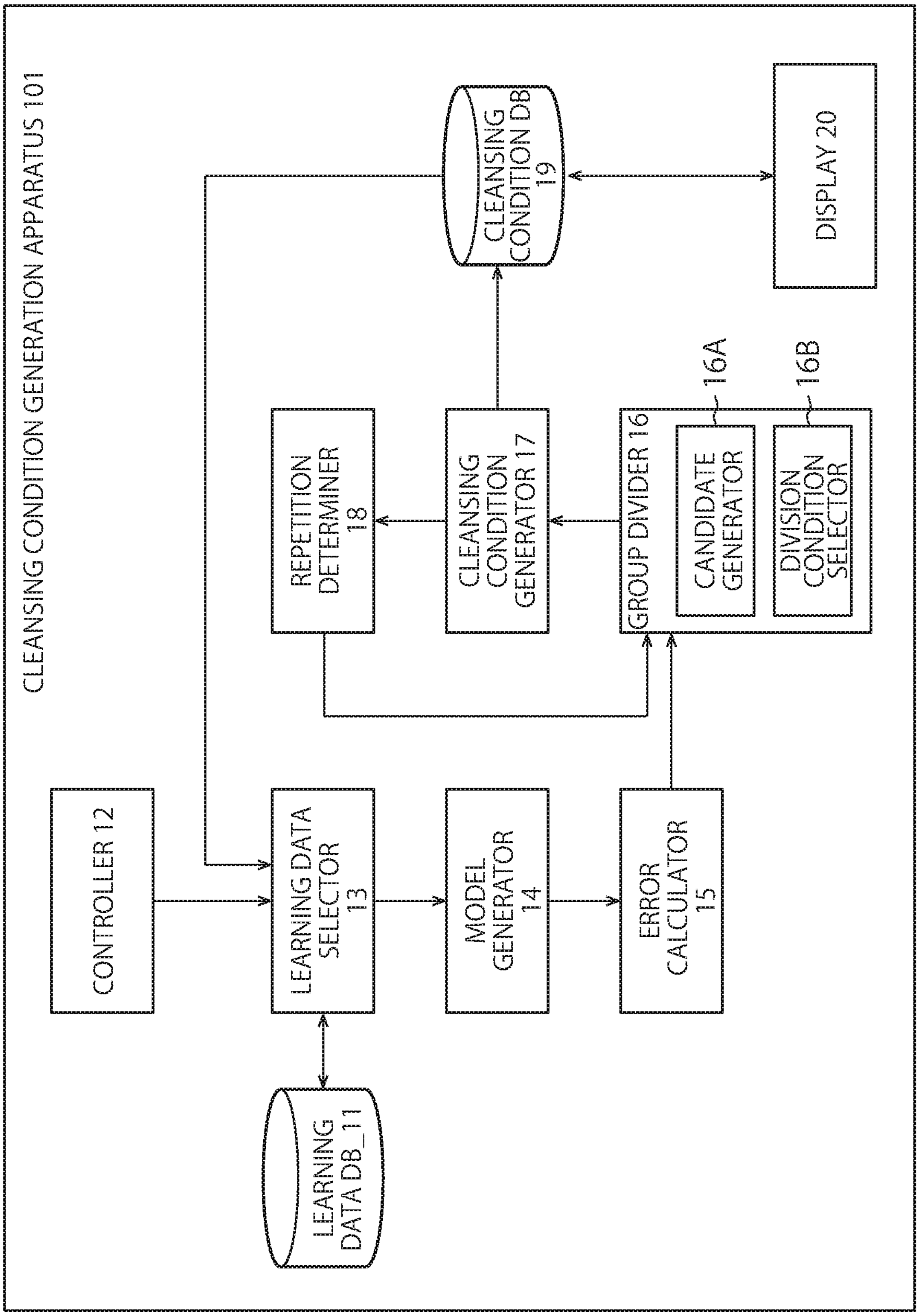
FIG. 17 is a block diagram of a cleansing condition generation apparatus according to a second embodiment.

FIG. 17 is a block diagram of a cleansing condition generation apparatus 101 that is an information processing apparatus according to a second embodiment. Blocks having the same names as those in FIG. 1 are assigned the same symbols. Except enlarged or changed processes, the description is appropriately omitted. Hereinafter, parts different from those in the first embodiment are mainly described.

In the first embodiment, the processes of the learning data selector 13, the model generator 14, the error calculator 15, the group divider 16 and the cleansing condition generator 17 are repeated. In the second embodiment, only the processes of the group divider 16 and the cleansing condition generator 17 are repeated. Accordingly, in the second embodiment, when the repetition determiner 18 determines to repeat the processes, it activates the group divider 16 instead of the learning data selector 13. The repetition determiner 18 or the group divider 16 selects instances satisfying the cleansing conditions having been generated so far by the cleansing condition generator 17. That is, the repetition determiner 18 or the group divider 16 includes a data selector that selects instances satisfying the cleansing conditions. The selected instances and the errors of the instances are used to perform the processes of the group divider 16. Consequently, in the second embodiment, after the model is generated by the model generator 14 first and the error is then calculated by the error calculator 15, the model generation by the model generator 14 and the error calculation by the error calculator 15 are not performed.

Figure 18:
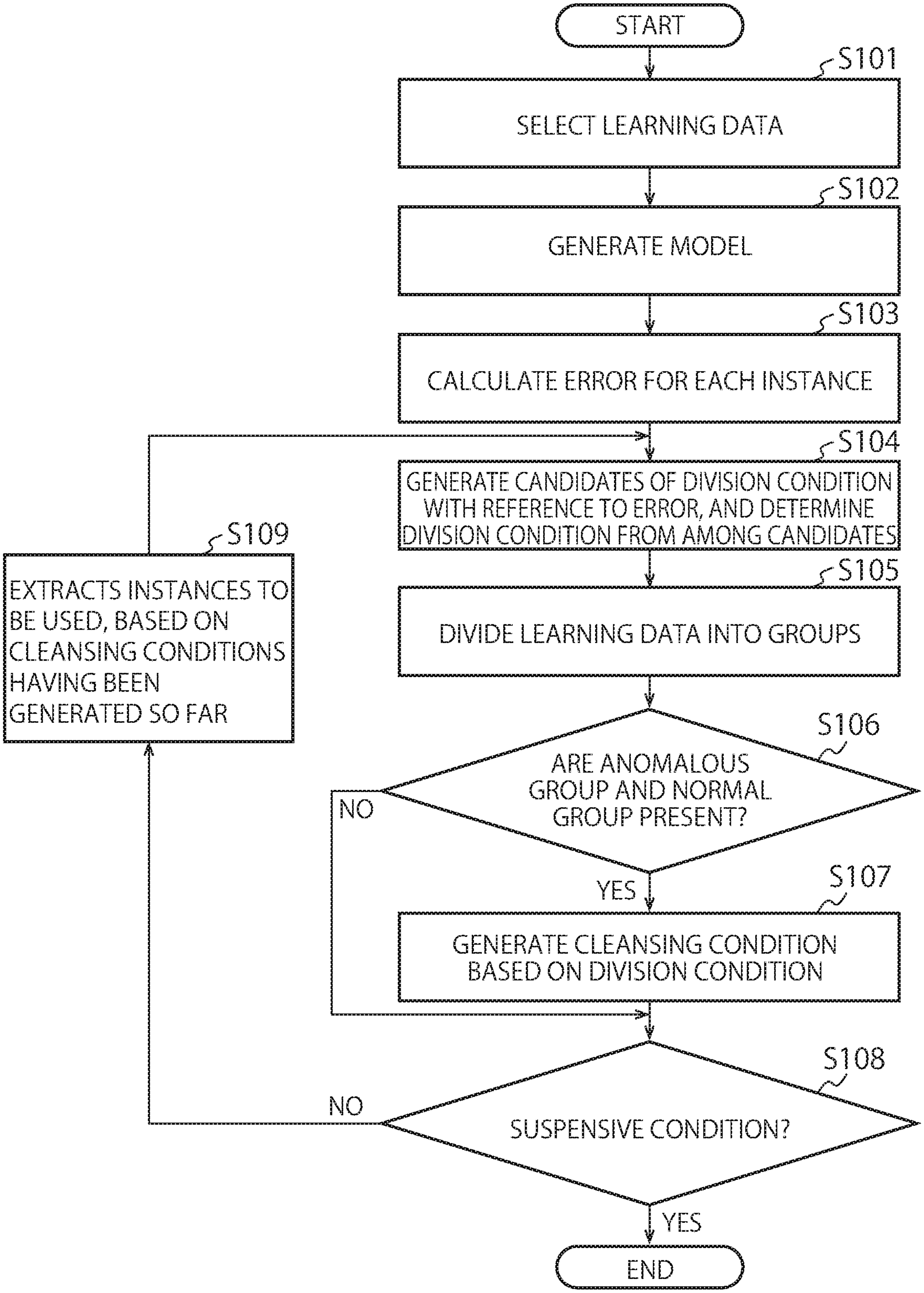
FIG. 18 is a flowchart showing an example of operations of the cleansing condition generation apparatus according to the second embodiment.

FIG. 18 is a flowchart showing an example of operations of the cleansing condition generation apparatus 101 according to the second embodiment. The difference from the flowchart in the first embodiment (see FIG. 7) is that when it is determined that the suspensive condition is not satisfied in step S108, the processing proceeds to step S109, and after step S109, the processing returns to step S104. The model generation in step S102, and the error calculation in step S103 are performed only once. In step S109, the repetition determiner 18 or the group divider 16 selects instances satisfying the cleansing conditions having been generated so far by the cleansing condition generator 17. The selected instances and the errors of the selected instances are used to perform the subsequent processes of the group divider 16 (S104 and S105).

According to the second embodiment, the model generation in step S102 and the error calculation in step S103 are performed only once. Accordingly, the processes can be performed at high speed.

Third Embodiment

A block diagram of a cleansing condition generation apparatus 101 that is an information processing apparatus according to a third embodiment is the same as that of the second embodiment in FIG. 17.

In the second embodiment, one candidate having the highest improved score is determined as the division condition by the group divider 16. In the third embodiment, a candidate is selected in a descending order of the improved score each time the repetitive process is performed, and the selected candidate is selected as the division condition. For example, the first process selects the candidate with the improved score having the maximum value. The first repetitive process selects the second highest candidate, and the second repetitive process selects the third highest candidate, as the division condition.

Similar to the second embodiment, the repetitive process according to this embodiment may select instances to be used using the cleansing conditions having been generated so far, and perform processes of the group divider 16 and thereafter. Alternatively, at each repetitive process, the processes of the group divider 16 and thereafter can be performed using all the instances every time.

Figure 19:
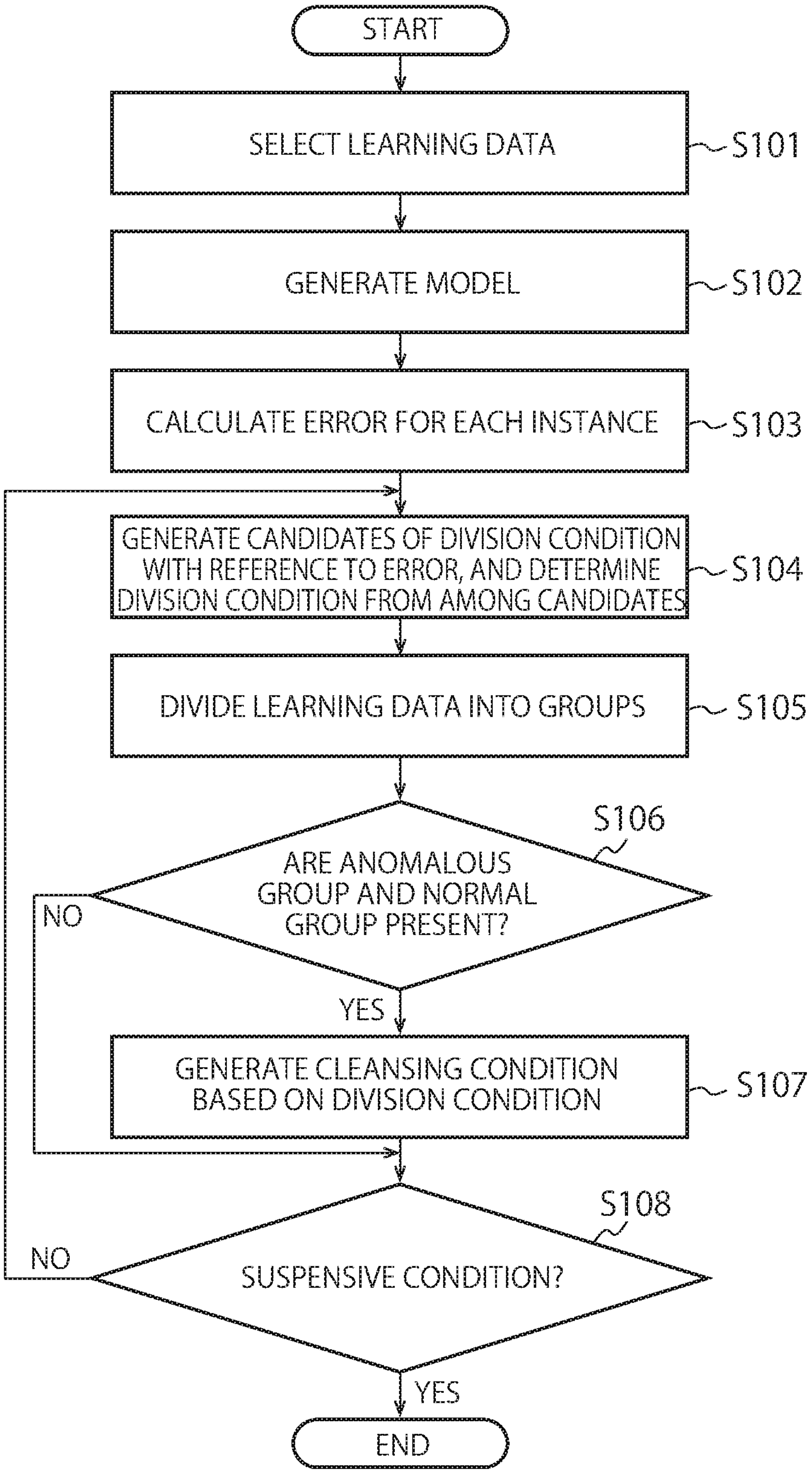
FIG. 19 is a flowchart showing another example of operations of the cleansing condition generation apparatus according to the second embodiment.

FIG. 19 is a flowchart showing an example of operations of the cleansing condition generation apparatus 101 according to the third embodiment. The operations are different from those of the flowchart in FIG. 18 in that in the repetitive process, the processes of the group divider 16 and thereafter are performed using all the instances every time. That is, the flowchart of FIG. 19 corresponds to that obtained by omitting step S109 from the flowchart of FIG. 18.

According to this embodiment, multiple candidates are used as the division condition, and the division condition is applied in a descending order of the improved score.

Accordingly, the number of repetitive processes can be reduced, which can complete the process of generating the cleansing condition at high speed.

Fourth Embodiment

Figure 20:
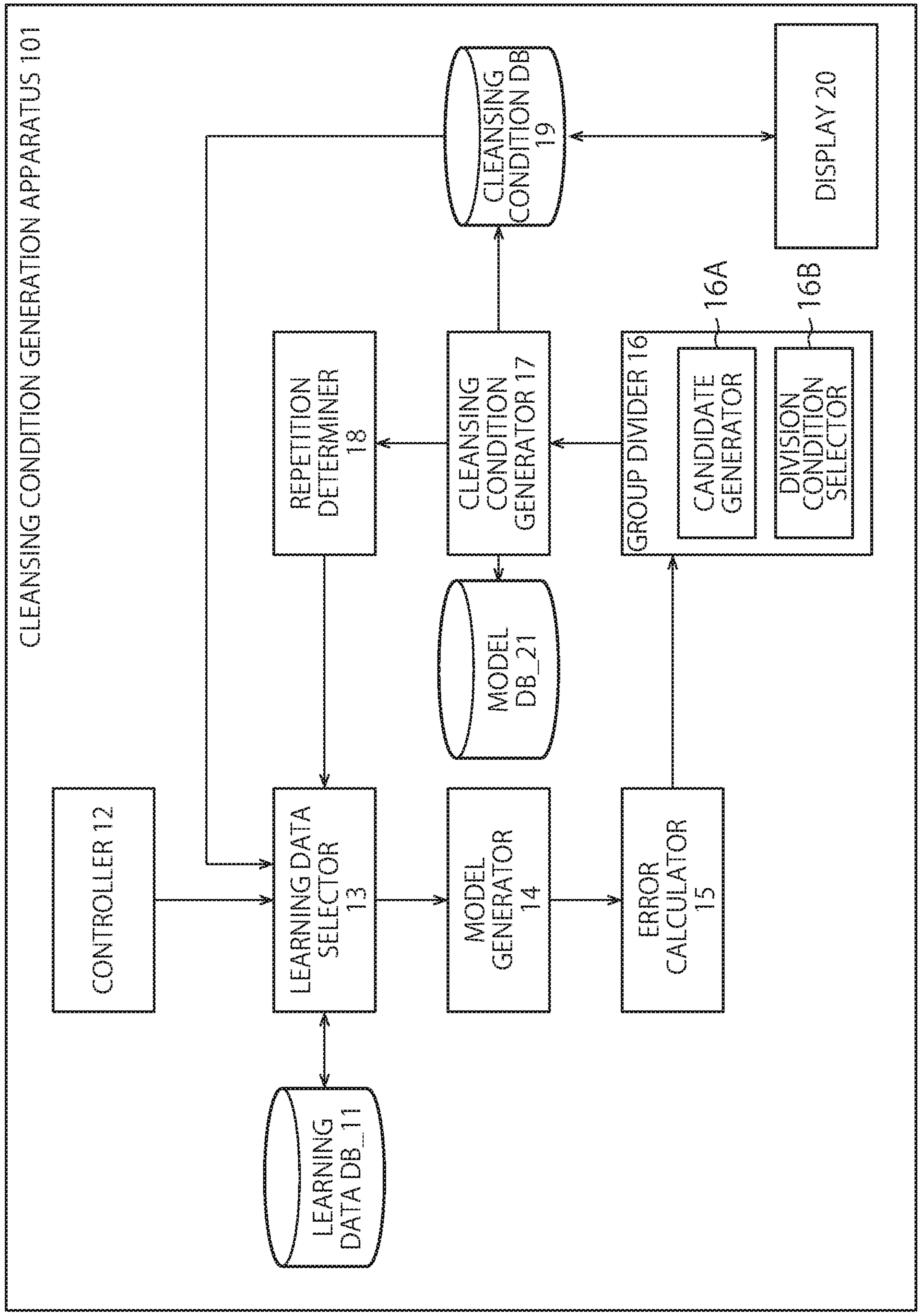
FIG. 20 is a block diagram of a cleansing condition generation apparatus according to a fourth embodiment.

FIG. 20 is a block diagram of a cleansing condition generation apparatus 101 that is an information processing apparatus according to a fourth embodiment. Blocks having the same names as those in FIG. 1 are assigned the same symbols. Except enlarged or changed processes, the description is appropriately omitted. Hereinafter, parts different from those in the first embodiment are mainly described.

Similar to the modified example 1 of the first embodiment, according to the fourth embodiment, also when all the groups belonging to multiple sections obtained by division with the division condition are normal groups, the conditions for selecting for the respective normal groups are generated as the cleansing conditions. Furthermore, in this embodiment, the cleansing condition generator 17 generates a determination tree (model tree) for classifying instances in parallel with generation of the cleansing condition.

Figures 21, 22:
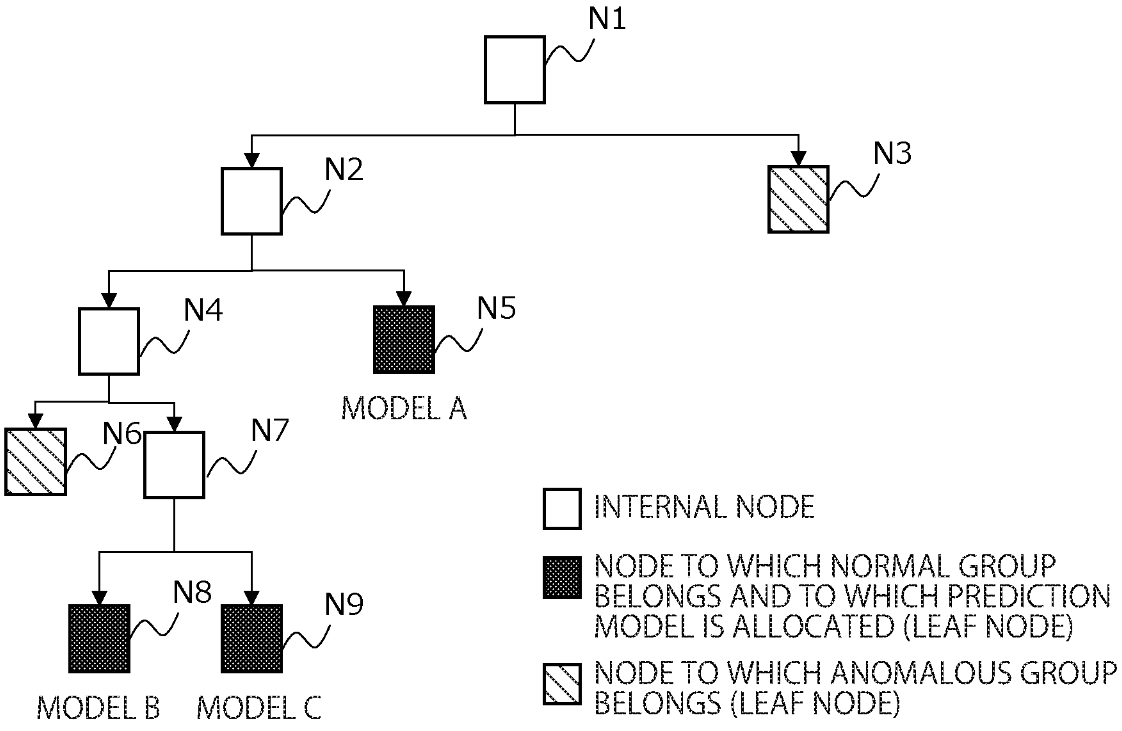
FIG. 21 shows an example of a determination tree.
FIG. 22 shows a parameter example of models stored in a model DB.

FIG. 21 shows an example of the determination tree. All the instances belong to the root node (internal node) N1 of the determination tree. After a cleansing condition is generated first for the root node N1, the root node N1 of the determination tree is branched according to the branch condition (corresponding to the cleansing condition), and internal nodes N2 and N3 are added to the respective branch destinations. The internal nodes are nodes other than leaf nodes (end nodes). The instances are classified into internal nodes in conformity with the branch condition according to which the root node corresponds to each internal node. The branch condition corresponds to cleansing. The instances are classified into the internal node N2 or N3 according to whether to satisfy the cleansing condition or not. In this example, the instances that satisfy the cleansing condition are classified into the internal node N2. The instances that does not satisfy the cleansing condition are classified into the internal node N3. A group of instances belonging to the internal node N2 is a normal group. A group of instances belonging to the internal node N3 is an anomalous group.

If the cleansing condition generator 17 determines that the group classified into the internal node is a normal group and satisfies a model generation condition, this generator determines that the internal node is a leaf node (end node). The model generation condition is defined as follows based on the number of instances belonging to the normal group, for example. In this example, if the number of instances belonging to the normal group is less than a threshold, it is determined that the model generation condition is satisfied. If the number is equal to or more than the threshold, it is determined that the model generation condition is not satisfied.

$|D\_g|<c$ $|D_g|$: the number of instances of g group, and c: threshold

In FIG. 21, the internal node N2 is branched to internal nodes N4 and N5 according to the branch condition (cleansing condition). In this example, both the internal nodes N4 and N5 are classified into the normal group. Accordingly, the cleansing conditions (branch conditions) for the respective normal groups are associated with the internal node N2. According to which branch condition is satisfied, the instances are classified into the internal node N4 or N5. The normal group of the internal node N5 satisfies the model generation condition, and the internal node N5 is determined as the leaf node. Accordingly, based on the instances belonging to the normal group, a prediction model A is generated. The generated prediction model A is allocated to the leaf node N5. The cleansing condition generator 17 stores, in a model DB 21, the model parameter of the generated prediction model A.

If the group classified into the internal node is an anomalous group, the cleansing condition generator 17 determines the internal node as a leaf node. However, the cleansing condition generator 17 does not generate a prediction model for an anomalous group. For example, the group classified into the internal node N3 is an anomalous group and is determined as a leaf node, but no prediction model is generated.

The internal node N4 is branched into internal nodes N6 and N7 according to the branch condition (cleansing condition), and the internal node N6 is determined as a leaf node to which an anomalous group belongs. The internal node N7 is branched to internal nodes N8 and N9 according to the branch condition (cleansing condition). Both groups to which the internal nodes N8 and N9 belong are normal groups, and the model generation condition is satisfied. The internal nodes N8 and N9 are determined as leaf nodes, and prediction models B and C are generated. The prediction models B and C are allocated to the leaf nodes N8 and N9. The cleansing condition generator 17 stores the model parameters of the prediction models B and C in the model DB 21.

As described above, generation of the cleansing condition, and generation of the model tree (generation of the determination tree where the prediction model is allocated to the leaf node) are performed in parallel with each other. Use of the model tree can identify the prediction model to be applied to the prediction target data from the model tree at high speed. That is, based on the explanatory variable included in the prediction target data, the prediction target data is classified into any leaf node according to the branch condition of each internal node of the model tree. In a case of classification into the leaf node to which the prediction model is allocated, the prediction model allocated to the leaf node is applied to the prediction target data to predict the objective variable.

FIG. 22 shows parameter examples of models stored in the model DB 21. The model DB 21 stores the model IDs of the prediction models, and the model parameters of the prediction models. The type of the prediction model may be similar to the model generated by the model generator 14 or the model generated by the prediction model generator 33 in FIG. 14. The model DB 21 may store the ID of the leaf node to which the prediction model is allocated. The prediction model is, for example, a regression model. In this case, the coefficients of the regression equation is stored as the model parameters, FIG. 23 shows an example of the cleansing DB 19. The cleansing DB 19 according to the fourth embodiment has a format basically similar to that of the cleansing DB 19 in the modified example 1 of the first embodiment. Note that if the groups selected with the corresponding cleansing conditions are normal groups and satisfy the model generation condition, "NEXT ID 1" and "NEXT ID 2" store the IDs of prediction models generated for the respective groups. Similar to the modified example 1 of the first embodiment, for the anomalous group, the column of the cleansing condition 1 or 2, and the column of the next ID 1 or 2 is "NA". The cleansing DB 19 in FIG. 23 represents the model tree.

Figure 24:
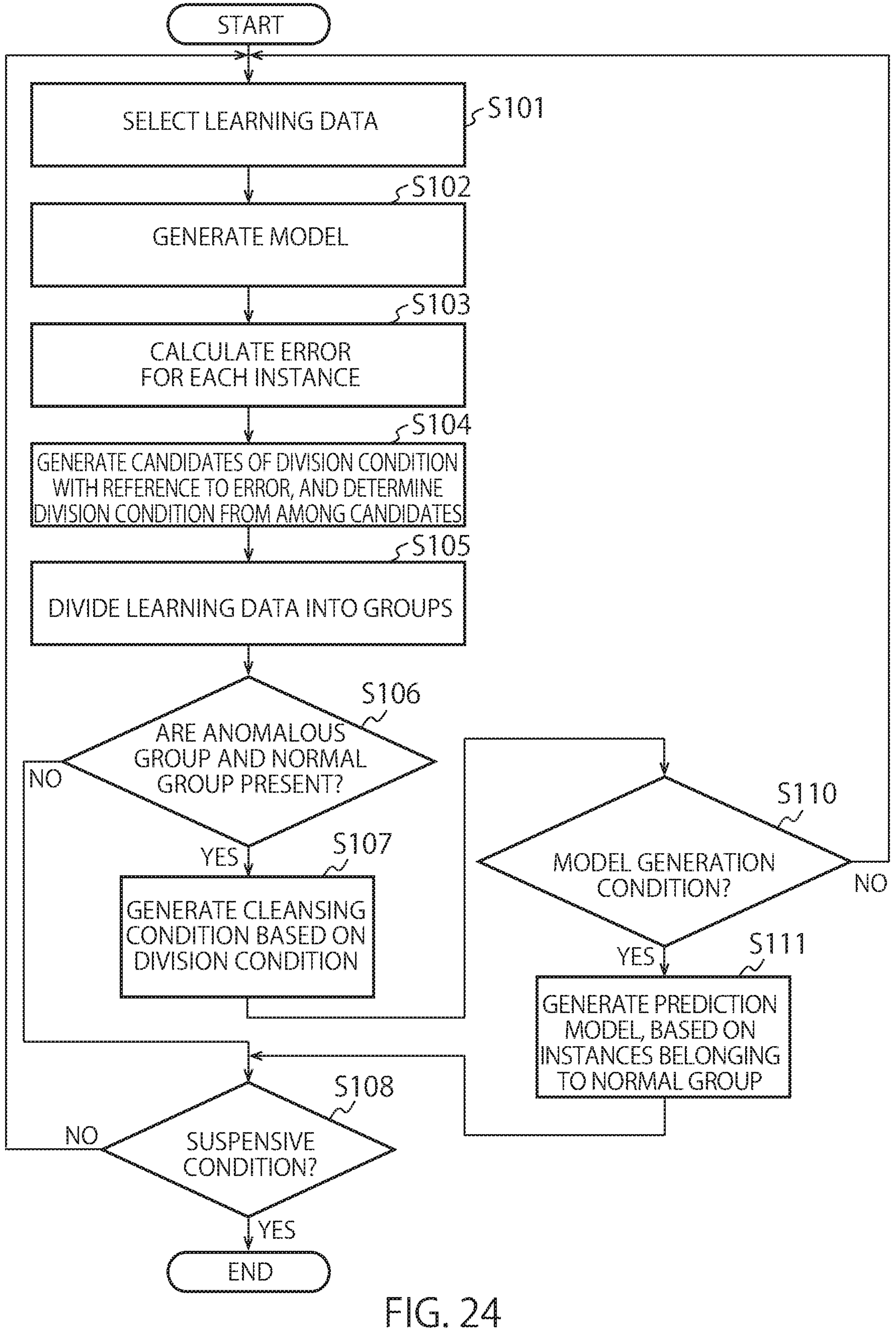
FIG. 24 is a flowchart showing an example of operations of a cleansing condition generation apparatus according to the fourth embodiment.

FIG. 24 is a flowchart showing an example of operations of a cleansing condition generation apparatus according to the fourth embodiment. Steps S110 and S111 are added to the flowchart (see FIG. 16) of the modified example 1 of the first embodiment. After step S107, the processing proceeds to step S110.

In step S110, the cleansing condition generator 17 determines whether the normal group satisfies the model generation condition. If the model generation condition is not satisfied, the processing returns to a flow of selecting an instance, and the repetitive operation is performed. If the model generation condition is satisfied, in step S111 the prediction model is generated based on the instance belonging to the normal group, and the processing exits the repetitive operations.

As described above, according to this embodiment, anomalous instances can be removed during the process of generating the model tree. That is, removal of the anomalous instance, and generation of the prediction model can be performed at the same time.

Modified Example

If the accuracy of the prediction model before division of the group of instances is equivalent to the accuracy of the prediction model generated from each group after division, this means execution of unnecessary division. Accordingly, in this modified example, the error of the prediction model of the group before division, and the error of the prediction model of each group after division are calculated. Error calculation may be similar to that of the error calculator 15. The error improvement degree is evaluated. If the improvement degree is low, the prediction model of each divided group is discarded, and the prediction model of the group before division is adopted. The configuration of the model tree is also returned to that of the model tree before division. If the improvement degree is high, the prediction model generated from each group after division is adopted.

Evaluation of the error improvement degree is determined, for example, by a difference obtained by subtraction that subtracts the average of the errors of the prediction models of the respective groups after division from the error of the prediction model of the group before division. If the subtracted difference value is positive and is equal to or more than a certain value, it is determined that the improvement degree is high. If the subtracted difference is positive and is less than the certain value, or if the subtracted difference value is negative, it is determined that the improvement degree is low. The error improvement degree may be evaluated using another method.

Fifth Embodiment

A fifth embodiment is based on the fourth embodiment. In a case where instances are sequentially added to the learning data DB 11 of this cleansing condition generation apparatus, learning is applied to a model tree online. As an online determination tree learning algorithm applicable to stream data, VFDT (Very Fast Decision Tree) is known. The processes of this flowchart is also based on VFDT.

Figure 25:
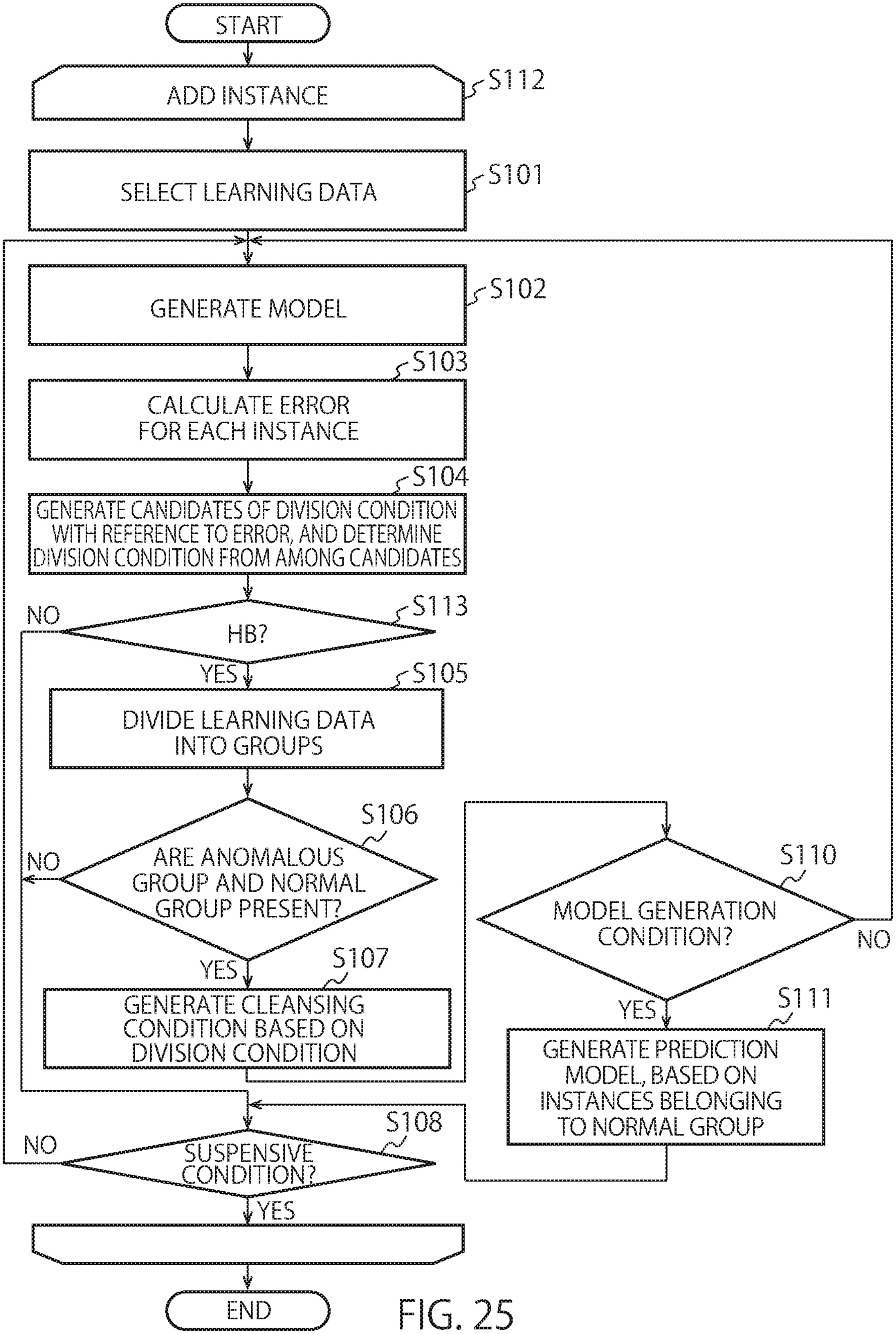
FIG. 25 is a flowchart showing an example of operations of a cleansing condition generation apparatus according to a fifth embodiment.

FIG. 25 is a flowchart showing an example of operations of a cleansing condition generation apparatus according to the fifth embodiment. Step S112 of adding an instance, and step S113 of determining a Hoeffding Bound (HB) condition are added to the flowchart according to the fourth embodiment. For example, situations are assumed where the cleansing condition and the model tree are preliminarily generated by the fourth embodiment and subsequently instances are added.

The processes of FIG. 25 are executed every time an instance is added to the learning data DB 11 in step S112. When the instance is added, the leaf node into which the instance is classified is identified from the model tree in step S101, and the existing instance classified into the same leaf node is selected (S101). Based on the added instance and the selected instance, model generation and error calculation are performed (S102 and S103).

In step S104, with reference to the error, a plurality of candidates of the division condition are generated, and the improved score is calculated for each candidate. The candidate of the division condition with the maximum improved score, and the candidate of the division condition with the second highest improved score are identified. The following Hoeffding Bound condition is determined. Satisfaction of the Hoeffding Bound condition means that it is assumed that the value occurring in a section with a range of "R" is independently observed "n" times to calculate the sample mean $$\bar{x} \quad \text{[Equation 26]}$$

and the true mean is "μ", and it is assured that the probability satisfying the following equation is equal to or more than "δ"

$$\mu >= \bar{x} \quad \text{[Equation 27]}$$

The Hoeffding Bound condition is represented by the following equation. "δ" is preset as a parameter.

$$o_{j,k} - o'_{j,k} > \sqrt{\frac{R^2 \ln\left(\frac{1}{\delta}\right)}{2n}} \quad \text{[Equation 28]}$$

$o_{j,k}$: highest improved score $o'_{j,k}$: second highest improved score $n$: the number of instances in corresponding group $R$: range of $x_j$ used for branch condition If the Hoeffding Bound condition is satisfied, the division condition for the maximum improved score is determined, and the processing proceeds to step S105. The processes thereafter are the same as those in the fourth embodiment.

If the Hoeffding Bound condition is not satisfied, the processing proceeds to step S108. In this case, division of the learning data, generation of the cleansing condition, the update of the model tree, and the like are not performed.

Figure 26:
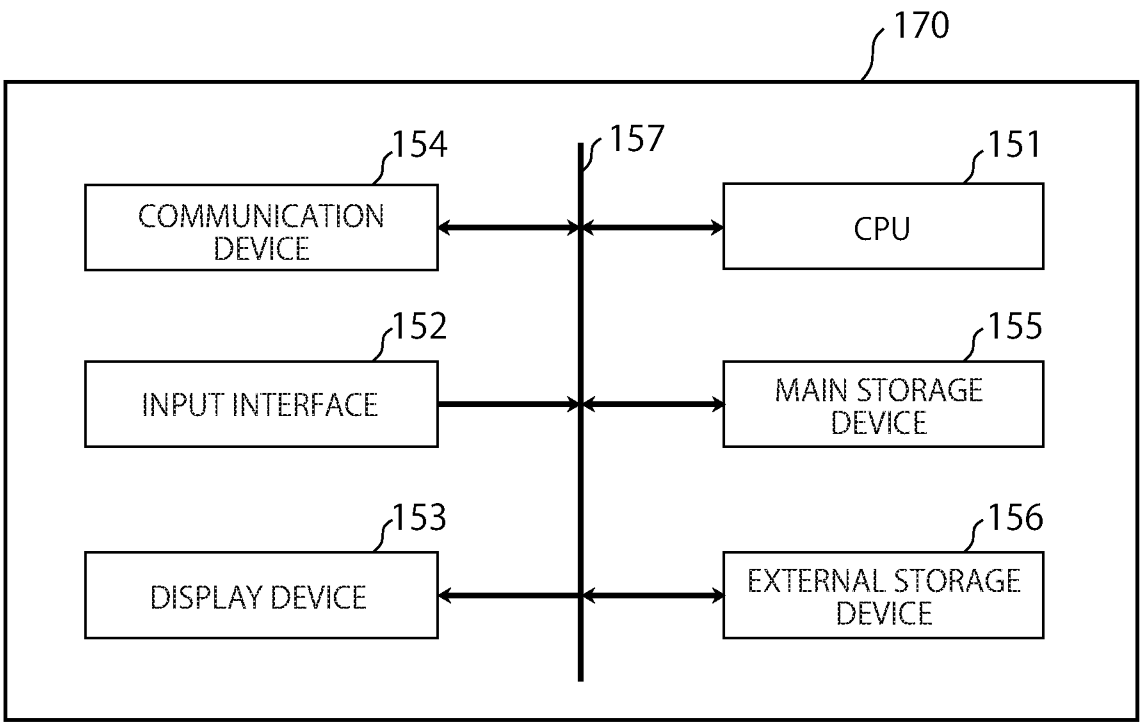
FIG. 26 shows a hardware configuration of the information processing apparatus according to this embodiment.

FIG. 26 illustrates a hardware configuration of the information processing apparatus 101 according to the present embodiment. The information processing apparatus 101 according to the present embodiment is configured with a computer device 100. The computer device 100 includes a CPU 151, an input interface 152, a display device 153, a communication device 154, a main storage device 155 and an external storage device 156, and these are connected to each other with a bus 157.

The CPU (Central Processing Unit) 151 executes a computer program which realizes the above-described respective functional configurations of information processing apparatus 101 on the main storage device 155. By the CPU 151 executing the computer program, the respective functional configurations are realized.

The input interface 152 is a circuit for inputting an operation signal from the input device such as a keyboard, a mouse and a touch panel, to the information processing apparatus 101. The input function of the information processing apparatus 101 can be constructed on the input interface 152.

The display device 153 displays data or information output from the information processing apparatus 101. While the display device 153 is, for example, an LCD (Liquid Crystal Display), a CRT (Cathode-Ray Tube), and a PDP (Plasma Display Panel), the display device 153 is not limited to this. The data or the information output from the computer device 100 can be displayed by this display device 153. The output device of the information processing apparatus 101 can be constructed on the display device 153, The communication device 154 is a circuit for the information processing apparatus 101 to communicate with an external device in a wireless or wired manner. Information can be input from the external device via the communication device 154. Information input from the external device can be stored in a DB.

The main storage device 155 stores a program which realizes processing of the present embodiment, data required for execution of the program, data generated by execution of the program, and the like. The program is developed and executed on the main storage device 155. While the main storage device 155 is, for example, a RAM, a DRAM and an SRAM, the main storage device 155 is not limited to this. The storage in each embodiment may be constructed on the main storage device 155.

The external storage device 156 stores the above-described program, data required for execution of the program, data generated by execution of the program, and the like. These kinds of program and data are read out to the main storage device 155 upon processing of the present embodiment. While the external storage device 156 is, for example, a hard disk, an optical disk, a flash memory and a magnetic tape, the external storage device 156 is not limited to this. The storage in each embodiment may be constructed on the external storage device 156.

Note that the above-described program may be installed in the computer device 100 in advance or may be stored in a storage medium such as a CD-ROM. Further, the program may be uploaded on the Internet.

Note that the computer device 100 may include one or a plurality of the processors 151, the input interfaces 152, the display devices 153, the communication devices 154 and the main storage devices 155, or peripheral equipment such as a printer and a scanner may be connected to the computer device 100.

Further, the information processing apparatus 101 may be configured with a single computer device 100 or may be configured as a system including a plurality of computer devices 100 which are connected to each other.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus, comprising:

a difference calculator implemented by processing circuitry, configured to calculate, based on a plurality of data items each including an objective variable and explanatory variables, a plurality of differences between the objective variable and prediction values of the objective variable predicted from the explanatory-variables;

a candidate generator implemented by processing circuitry, configured to generate at least one first division condition candidate which divides each of the explanatory variables into a plurality of sections;

a division condition selector implemented by processing circuitry, configured to select a first division condition from the at least one first division condition candidate, based on the differences calculated by the difference calculator, the explanatory variable divided by the first division condition corresponding to a first explanatory variable of the explanatory variables;

a selection condition generator implemented by processing circuitry, configured to determine whether each of the sections obtained by dividing the first explanatory variable with the first division condition satisfies an anomaly condition based on a number of data items belonging to each of the sections to select a first section which is the section not satisfying the anomaly condition, and generate a first selection condition which selects data items belonging to the first section based on a range of values of the first explanatory variable specified by the first section; and a data selector implemented by processing circuitry, configured to select first data items from among the plurality of data items, based on the first selection condition, wherein the candidate generator is configured to generate at least one second division condition candidate which divides each of the explanatory variables into a plurality of sections, the division condition selector is configured to select a second division condition from the at least one second division condition candidate based on differences calculated by the difference calculator from the first data items belonging to each of the sections into which each explanatory variable is divided, the explanatory variable divided by the second division condition corresponding to a second explanatory variable different from the first explanatory variable among the explanatory variables, and the selection condition generator is configured to determine whether each of the sections obtained by dividing the second explanatory variable with the second division condition satisfies an anomaly condition based on a number of first data items belonging to each of the sections to select a second section which is the section not satisfying the anomaly condition, and generate a second selection condition which selects data items belonging to the second section based on a range of values of the second explanatory variable specified by the second section.

2. The information processing apparatus according to claim 1, wherein each of the first division condition candidate and the second division condition candidate includes an ID of the explanatory variable targeted to divide and includes at least one division reference value for dividing the targeted explanatory variable into the sections.

3. The information processing apparatus according to claim 1, wherein the division condition selector selects the first division condition, based on a dispersion of the differences calculated by the difference calculator based on the plurality of data items and based on a dispersion of the differences calculated by the difference calculator for in each of the sections based on the data items belonging to each of the sections.

4. The information processing apparatus according to claim 1, wherein the division condition selector selects the first division condition, based on an average of the differences in each of the sections.

5. The information processing apparatus according to claim 1, wherein the anomaly condition defines that a number of data items belonging to each of the sections is less than a threshold, or a ratio of a number of data items belonging to each of the sections to a number of the plurality of data items is less than a threshold.

6. The information processing apparatus according to claim 1, further comprising a model generator implemented by processing circuitry, configured to generate, based on the plurality of data items or the first data items, a first model where the explanatory variables and the objective variable are associated with each other, wherein the difference calculator calculates the objective variable, based on the first model and the explanatory variables included in the data items or the first data items, and calculates the differences between the calculated objective variable and the objective variable included in the data items or the first data items.

7. The information processing apparatus according to claim 6, further comprising a repetition determiner implemented by processing circuitry, configured to determine whether to repeat processes by the model generator, the difference calculator, the candidate generator, the division condition selector, and the selection condition generator, wherein when repetition is determined by the repetition determiner, the data selector selects the first data items.

8. The information processing apparatus according to claim 1, further comprising a repetition determiner implemented by processing circuitry, configured to determine whether to repeat processes by the candidate generator, the division condition selector, and the selection condition generator, wherein when repetition is determined by the repetition determiner, the data selector selects the first data item.

9. The information processing apparatus according to claim 1, wherein the division condition selector selects a third division condition from the at least one first division condition candidate other than the first division condition, and the selection condition generator determines whether each of the sections obtained by dividing the third explanatory variable with the third division condition satisfies the anomaly condition based on a number of data items belonging to each of the sections to select a third section which is the section not satisfying the anomaly condition, and generate a third selection condition which selects data items belonging to the third section based on a range of values of the third explanatory variable specified by the third section.

10. The information processing apparatus according to claim 9, further comprising a repetition determiner implemented by processing circuitry, configured to determine whether to repeat processes by the division condition selector, and the selection condition generator, wherein when repetition is determined by the repetition determiner, the division condition selector selects the third division condition.

11. The information processing apparatus according to claim 1, wherein the selection condition generator generates a determination tree that includes a plurality of nodes, and a branch condition corresponding to a node other than an end node among the nodes, and adds the node, and the branch condition corresponding to the node, based on the first selection condition generated by the selection condition generator, and classifies the data items according to the determination tree, generates a prediction model where the explanatory variables and the objective variable are associated with each other, based on the data item classified into the end node, and associates the generated prediction model with the end node.

12. The information processing apparatus according to claim 11, wherein a new data item including the objective variable and the explanatory variables is added into a database, the selection condition generator updates the determination tree, based on the new data item added into the database.

13. The information processing apparatus according to claim 1, further comprising:

a preprocessor implemented by processing circuitry, configured to select data items satisfying both of the first selection condition and the second selection condition from among data items including the explanatory variable and the objective variable;

a prediction model generator implemented by processing circuitry, configured to generate, based on the selected data items, a prediction model where the explanatory variable and the objective variable are associated with each other; and a predictor implemented by processing circuitry, configured to calculate the objective variable, based on the prediction model, and a prediction target data item including the explanatory variable.

14. The information processing apparatus according to claim 1, wherein the objective variable is a variable pertaining to an observation target.

15. An information processing method, comprising:

calculating, based on a plurality of data items each including an objective variable and explanatory variables, a plurality of differences between the objective variable and prediction values of the objective variable predicted from the explanatory variables;

generating at least one first division condition candidate which divides each of the explanatory variables into a plurality of sections;

selecting a first division condition from the at least one first division condition candidate which divides each of the explanatory variables, based on the differences calculated, the explanatory variable divided by the first division condition corresponding to a first explanatory variable of the explanatory variables;

determining whether each of the sections obtained by dividing the first explanatory variable with the first division condition satisfies an anomaly condition based on a number of data items belonging to each of the sections to select a first section which is the section not satisfying the anomaly condition, and generating a first selection condition which selects data items belonging to the first section based on a range of values of the first explanatory variable specified by the first section;

selecting first data items from among the plurality of data items, based on the first selection condition;

generating at least one second division condition candidate which divides each of the explanatory variables into a plurality of sections;

selecting a second division condition from the at least one second division condition candidate based on differences calculated from the first data items belonging to each of the sections into which each explanatory variable is divided, the explanatory variable divided by the second division condition corresponding to a second explanatory variable different from the first explanatory variable among the explanatory variables; and determining whether each of the sections obtained by dividing the second explanatory variable with the second division condition satisfies an anomaly condition based on a number of first data items belonging to each of the sections to select a second section which is the section not satisfying the anomaly condition, and generating a second selection condition which selects data items belonging to the second section based on a range of values of the second explanatory variable specified by the second section.

16. A non-transitory computer readable medium having a computer program stored therein which causes a computer executing the computer program to perform processes comprising:

calculating, based on a plurality of data items each including an objective variable and explanatory variables, a plurality of differences between the objective variable and prediction values of the objective variable predicted from the explanatory variables;

generating at least one first division condition candidate which divides each of the explanatory variables into a plurality of sections;

selecting a first division condition from the at least one first division condition candidate which divides each of the explanatory variables, based on the differences calculated, the explanatory variable divided by the first division condition corresponding to a first explanatory variable of the explanatory variables;

determining whether each of the sections obtained by dividing the first explanatory variable with the first division condition satisfies an anomaly condition based on a number of data items belonging to each of the sections to select a first section which is the section not satisfying the anomaly condition, and generating a first selection condition which selects data items belonging to the first section based on a range of values of the first explanatory variable specified by the first section;

selecting first data items from among the plurality of data items, based on the first selection condition;

generating at least one second division condition candidate which divides each of the explanatory variables into a plurality of sections;

selecting a second division condition from the at least one second division condition candidate based on differences calculated from the first data items belonging to each of the sections into which each explanatory variable is divided, the explanatory variable divided by the second division condition corresponding to a second explanatory variable different from the first explanatory variable among the explanatory variables; and determining whether each of the sections obtained by dividing the second explanatory variable with the second division condition satisfies an anomaly condition based on a number of first data items belonging to each of the sections to select a second section which is the section not satisfying the anomaly condition, and generating a second selection condition which selects data items belonging to the second section based on a range of values of the second explanatory variable specified by the second section.

* * * * *

UNITED STATES PATENT AND TRADEMARK OFFICE

CERTIFICATE OF CORRECTION

PATENT NO. : 12,136,023 B2
APPLICATION NO. : 17/015824
DATED : November 5, 2024
INVENTOR(S) : Fukushima et al.

It is certified that error appears in the above-identified patent and that said Letters Patent is hereby corrected as shown below:

In the Claims

Claim 3, Column 26, Line 4, “for in each” should read as —for each—.

Signed and Sealed this
Fifteenth Day of April, 2025

Coke Morgan Stewart
*Acting Director of the United States Patent and Trademark Office*